United States Patent
Kangas et al.

(10) Patent No.: US 11,050,467 B2
(45) Date of Patent: Jun. 29, 2021

(54) ROBUST MU-MIMO TRANSMISSION USING VIRTUAL UES

(71) Applicant: Telefonaktiebolaget LM Ericsson (publ), Stockholm (SE)

(72) Inventors: Ari Kangas, Lidingö (SE); Henrik Egnell, Uppsala (SE); Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/977,088

(22) PCT Filed: Mar. 21, 2018

(86) PCT No.: PCT/SE2018/050286
§ 371 (c)(1),
(2) Date: Aug. 31, 2020

(87) PCT Pub. No.: WO2019/182490
PCT Pub. Date: Sep. 26, 2019

(65) Prior Publication Data
US 2020/0412419 A1 Dec. 31, 2020

(51) Int. Cl.
*H04B 7/0452* (2017.01)
*H04B 7/0456* (2017.01)
*H04B 7/06* (2006.01)

(52) U.S. Cl.
CPC ......... *H04B 7/0452* (2013.01); *H04B 7/0473* (2013.01); *H04B 7/0617* (2013.01)

(58) Field of Classification Search
CPC .. H04B 7/0452; H04B 7/0473; H04B 7/0617; H04B 7/0456
See application file for complete search history.

(56) References Cited

U.S. PATENT DOCUMENTS

2020/0036426 A1* 1/2020 Kim .................. H04B 7/0695
2021/0051488 A1* 2/2021 Stirling-Gallacher ..................... H04W 56/001

FOREIGN PATENT DOCUMENTS

| EP | 3364554 A1 | 8/2018 |
|---|---|---|
| WO | 2017065372 A1 | 4/2017 |
| WO | 2019125240 A1 | 6/2019 |

OTHER PUBLICATIONS

International Search Report and Written Opinion for International Application No. PCT/SE2018/050286, dated Oct. 31, 2018, 11 pages.
3GPP TS 23.401 V15.3.0, "3rd Generation Partnership Project; Technical Specification Group Services and System Aspects; General Packet Radio Service (GPRS) enhancements for Evolved Universal Terrestrial Radio Access Network (E-UTRAN) access (Release 15)," Mar. 2018, 405 pages, 3GPP Organizational Partners.

* cited by examiner

*Primary Examiner* — Vineeta S Panwalkar
(74) *Attorney, Agent, or Firm* — NDWE LLP

(57) ABSTRACT

Ways to mitigate problems caused by too narrow transmission zero (nulls) without significantly increasing computational complexity. For example, the problem can be mitigated by modifying MU-MIMO transmission schemes so that the nulls are widened. This way, the UEs that are to be protected from transmission interference stay within the nulls, despite the angular disturbances.

16 Claims, 28 Drawing Sheets

SINR as a function of the angle. Receiving UE in -0.1, interferred UE in 0.7.

SINR as a function of the angle. Receiving UE in 0.7, interferred UE in -0.1.

SINR as a function of the angle. Receiving UE in -0.1, interferred UE in 0.7.
Random phase noise error 5 degrees, 1-sigma SINR as a function of the angle. Receiving UE in 0.7,
interferred UE in -0.1. Random phase noise error 5 degrees,
1-sigma The SIR of the transmission to UE 1 at -0.1. The UE at 0.7 is nulled. No virtual UEs The SIR of the transmission to UE 1 at -0.1. The UE at 0.7 is nulled. No virtual UEs The SIR of the transmission to UE 1 at -0.1. The UE at 0.7 is nulled.
Two virtual UEs per UE The SIR of the transmission to UE 2 at 0.7. The UE at 0.7 is nulled. Two virtual UEs per UE The SIR of the transmission to UE 1 at -0.1. The UE at 0.7 is nulled. Two virtual UEs per UE. Virtual UE separation +/-0.01 rad The SIR of the transmission to UE 2 at 0.7. The UE at -0.1 is nulled. Two virtual UEs per UE. Virtual UE separation +/-0.01 rad The SIR of the transmission to UE 1 at -0.1. The UE at 0.7 is nulled. Four virtual UEs per UE. Virtual UE separation +/-0.01 rad The SIR of the transmission to UE 2 at 0.7. The UE at -0.1 is nulled. Four virtual UEs per UE. Virtual UE separation +/-0.01 rad The SIR of the transmission to UE 1 at -0.1. The UE at 0.7 is nulled.
Two virtual UEs per UE. Virtual UE separation +/-0.02 rad The SIR of the transmission to UE 2 at 0.7. The UE at -0.1 is nulled.
Two virtual UEs per UE. Virtual UE separation +/-0.02 rad The SIR of the transmission to UE 1 at -0.1. The UE at 0.7 is nulled.
Four virtual UEs per UE. Virtual UE separation +/-0.02 rad The SIR of the transmission to UE 2 at 0.7. The UE at -0.1 is nulled.
Four virtual UEs per UE. Virtual UE separation +/-0.02 rad The SIR of the transmission to UE 1 at -0.1. The UE at 0.1 is nulled.
Four virtual UEs per UE. Virtual UE separation +/-0.02 rad The SIR of the transmission to UE 2 at 0.1. The UE at -0.1 is nulled.
Four virtual UEs per UE. Virtual UE separation +/-0.02 rad The SIR of the transmission to UE 1 at -0.05. The UE at 0.05 is nulled. Four virtual UEs per UE. Virtual UE separation +/-0.02 rad The SIR of the transmission to UE 2 at 0.05. The UE at -0.05 is nulled.
Four virtual UEs per UE. Virtual UE separation +/-0.02 rad The SIR of the transmission to UE 1 at -0.025. The UE at 0.025 is nulled. Four virtual UEs per UE. Virtual UE separation +/-0.02 rad The SIR of the transmission to UE 2 at 0.025. The UE at -0.025 is nulled. Four virtual UEs per UE. Virtual UE separation +/-0.02 rad

ROBUST MU-MIMO TRANSMISSION USING VIRTUAL UES

CROSS-REFERENCE TO RELATED APPLICATIONS

This application is a National stage of International Application No. PCT/SE2018/050286, filed Mar. 21, 2018, which is hereby incorporated by reference.

TECHNICAL FIELD

Disclosed are embodiments related to multi-user multiple-input-multiple-output (MU-MIMO).

BACKGROUND

In the emerging fifth generation (5G) cellular systems, beamforming and multiple-input-multiple-output (MIMO) transmission will be central technologies. The reason for this is that spectral resources are running out at low carrier frequencies and this leads to a gradual migration into higher frequency bands (e.g., the millimeter-wave (mmw) bands). At these high frequency bands beamforming and use of massive antenna arrays are needed to achieve a sufficient coverage. There is, for example, plenty of available spectrum around 28 GHz and 39 GHz in the US and other markets. This spectrum needs to be exploited to meet the increasing capacity requirements. The 5G frequency migration is expected to start at 3.5-5 GHz, and then continue to these 28 GHz and 39 GHz bands that are expected to become available relatively soon.

1. Beamforming and MIMO in General:

Beamforming and MIMO transmission is a mature subject today. This section just aims at presenting the basics, for a detailed treatment any textbook on digital communications could be consulted.

To explain the beamforming concept, consider FIG. 1 which shows an idealized one-dimensional beamforming case. In this case it is assumed that a user equipment (UE) 101 (i.e., a device capable of wireless communication with a radio access node, such as a base station) is located far away from a radio access node 105 having a plurality of antennas 102 (i.e., an antenna array). It follows that the difference in travel distance from the radio access node 105 to the UE 101, between adjacent antenna elements, is $l=k\lambda \sin(\theta)$, where $k\lambda$ is the antenna element separation. Here k is the separation factor which may be 0.5-0.7 in a typical correlated antenna element arrangement. This means that if a reference signal $s_i e^{j\omega t}$ transmitted from the i:th antenna element will arrive at the UE antenna as a weighted sum $$s_{UE} = \sum_{i=0}^{N-1} s_i h_i e^{j\omega\left(t-\frac{il}{c}\right)} = e^{j\omega t}\sum_{i=1}^{N-1} s_i h_i e^{-j\frac{ik\lambda\sin(\theta)}{f_c\lambda}} = e^{j\omega t}\sum_{i=1}^{N-1} s_i h_i e^{-j\frac{ik\sin(\theta)}{f_c}}.$$

Here $\omega$ is the angular carrier frequency, $h_i$ is the complex channel from the i:th antenna element, t is the time, and $f_c$ is the carrier frequency. In the above equation $\theta$ and $h_i$ are unknown. In case of a feedback solution, the UE therefore needs to search for all complex channel coefficients $h_i$ and the unknown angle $\theta$. For this reason, the standard defines a codebook of beams in different directions given by steering vector coefficients like $w_{m,i}=e^{-jf(m,i)}$, where m indicates a directional codebook entry. The UE then tests each codebook and estimates the channel coefficients. The information rate achieved for each codebook entry m is computed and the best one defines the direction and channel coefficients. This is possible since $s_i$ is known. The result is encoded and reported back to the base station. This provides the base station with a best direction (codebook entry) and information that allows it to build up a channel matrix H. This matrix represents the channel from each of the transmit antenna elements to each of the receive antenna elements. Typically, each element of H is represented by a complex number.

The channel matrix can then be used for beamforming computations, or the direction represented by the reported codebook entry can be used directly. In case of MIMO transmission the MIMO beamforming weight matrix W needs to be determined so that a best match according to a criterion is met.

2. Reciprocity Based CSI Estimation:

Channel reciprocity is a consequence of Maxwell's equations. Given two nodes (e.g, a UE and a base station) equipped with antenna arrays that communicate in a single frequency band, the channel reciprocity property means that at any given point in time, the complex channel coefficient between any transmitting antenna element in one node and any receiving antenna element in the other node, is the same (to within a transpose) in the uplink and the downlink. The channel matrix hence remains essentially the same between the antenna arrays of the two nodes when the direction of the transmission is reversed. It is noted that the time is assumed to be (almost) the same for the two directions of transmission.

To exploit reciprocity, the channel coefficients can be directly estimated by the base station from UE uplink transmission of known pilot signals, for example so called sounding reference signals, SRSs. The estimated channel can then be used to compute the combining weight matrix with a selected principle, and then used for downlink transmission. This works since the uplink and downlink channels are the same (to within a transpose) when reciprocity is valid.

3. MU-MIMO by Inversion of the Channel Matrix (H):

A very simple MU-MIMO scheme is so called Zero-Forcing (ZF) transmission. This scheme is sensitive and structurally limited since the number of antenna elements in the transmitter and receiver needs to be equal. It is however very straightforward and easy to compute. The beamforming weights W are then obtained from the estimated quadratic channel matrix H from the condition that the received signal vector s should equal the transmitted one x, i.e. $s=HWx=x$, $\forall x \Leftrightarrow W=H^{-1}$.

This choice thus makes the received data streams orthogonal in theory, provided that H is square and invertible.

4. MU-MIMO with RAT

For so called Reciprocity Assisted Transmission (RAT) the transmission scheme can be obtained by criterion minimization. In this case it is not needed that the estimated channel matrix $\hat{H}$ is a square matrix. The standard RAT criterion to be minimized is then $$\hat{W} = \underset{W}{\operatorname{argmin}} \|\hat{H}W - H^{ref}\|_{fro}^2$$

$$= \underset{W}{\operatorname{argmin}} \|(\hat{H} + \tilde{H})W - H^{ref}\|_{fro}^2$$

-continued $$= \underset{W}{\operatorname{argmin}} tr\left( (\hat{H}W - H^{ref} X \hat{H}^{DL} W - H^{ref})^H + W^H \hat{\Gamma} W \right),$$

where $\hat{\Gamma}$ is the estimate of the covariance matrix of $\tilde{H}^{DL}$, and where it is assumed that $\hat{H}$ and $\tilde{H}$ are uncorrelated. The minimizer of the criterion can be analytically computed as $$\hat{W} = ((\hat{H})^H \hat{H} + \hat{\Gamma})^{-1} (\hat{H})^H H^{ref}.$$

Here $H^{ref}$ is the desired channel matrix after the beamforming computations and the subscript fro denotes the use of the Frobenius norm.

SUMMARY

This disclosure is focused on improved ways to address the beamforming opportunities that arise in both the high mmw frequency bands and the lower 4G and 5G bands, below 6 GHz. A problem with operating in these bands is that very narrow transmission scheme nulls may reduce the performance of multi-user MIMO (MU-MIMO) transmission schemes. The problem is caused by the nulls having a much more narrow extension in the angular domain, than the impairments like beam weight quantization and phase noise.

The problem associated with the narrow nulls associated with MU-MIMO can be illustrated as follows. Consider a scenario with one gNB (i.e., a 5G base station) and two UEs with two TX antennas in the gNB and one RX antenna per UE. Beam patterns like the one in FIG. 2 and FIG. 3 then results in case of perfect channel knowledge. As can be seen sharp nulls are placed in the directions of the "other" UE to minimize cross-talking interference. However, this strategy is known to be non-robust in the presence of channel estimation errors due to, for example, beam weight quantization or phase noise. The consequence is that MU-MIMO obtained, for example, with RAT may deteriorate to an unacceptable level. To illustrate this fact, a random angular error of 5 degrees, 1-sigma, was added to the scenario. The effect is shown in FIG. 4 and FIG. 5. As can be seen, the null-forming breaks down completely, with variations and SINR losses exceeding 40 dBs!

Embodiments described here are focused on ways to mitigate these problems caused by too narrow transmission zero (nulls) without significantly increasing computational complexity. For example, the problem can be mitigated by modifying said MU-MIMO transmission schemes so that the nulls are widened. This way, the UEs that are to be protected from transmission interference stay within the nulls, despite the angular disturbances.

In one embodiment, an estimated channel model is augmented with additional steering vectors representing virtual UEs with their steering vectors slightly perturbed in angle, as compared to the real UE from which they are constructed. A typical scenario, as shown in FIG. 6, is that virtual UEs 601a-601d (dotted lines) are added in pairs on each side (in angle) of each real UE (shown in solid). As shown in FIG. 6, virtual UEs 601a and 601b are added on each side (in angle) of UE1, and virtual UEs 601c and 601d are added on each side (in angle) of UE 2. Embodiments further include means for computation of said perturbed steering vectors of said virtual UEs, and means for addition of a pre-selected amount of multiple virtual UEs by means of new scheduling functionality.

The idea with the virtual UE addition is also that the virtual UEs need to remain undisturbed by a transmission to another real UE than the one that generated said virtual UEs. This means that the RAT transmission scheme needs to create nulls also in the directions of the virtual UEs. Since the virtual UEs, in a preferred embodiment, are selected to be close (in angle) to the real UEs, the overall effect is expected to be a joint angular null, covering both the real UE and all virtual UEs generated from it. The consequence is widened nulls around the real UE directions.

Accordingly, in one aspect there is provided a method for wirelessly transmitting data to a first (UE). The method includes obtaining a first channel matrix for the first UE, a second channel matrix for a second UE, and a third channel matrix for a first virtual UE associated with the second UE. The method further includes forming a final channel matrix, $\hat{H}^V$, comprising the first channel matrix for the first UE, the second channel matrix for the second UE, and the third channel matrix for the first virtual UE. The method also includes using $\hat{H}^V$ to compute a set of beamforming weights, $\hat{W}^V$, and transmitting the data to the first UE using the set of beamforming weights, $\hat{W}^V$.

In some embodiments, the method also includes obtaining a fourth channel matrix for a second virtual UE associated with the second UE, wherein the final channel matrix, $\hat{H}^V$, further comprises the fourth channel matrix for the second virtual UE.

In some embodiments, using $\hat{H}^V$ to compute the set of beamforming weights, $\hat{W}^V$, comprises calculating: $\hat{W}^V = ((\hat{H}^V)^H \hat{H}^V + \hat{\Gamma}^V)^{-1} (\hat{H}^V)^H H^{ref}$, where $\hat{\Gamma}^V$ is a covariance matrix of a channel error matrix, $\tilde{H}^V$ (or $\hat{\Gamma}^V$ is an identity matrix), and $H^{ref}$ is a reference channel matrix.

In some embodiments, $H^{ref}$ is configured such that no transmission is made to the first virtual UE.

In some embodiments, the method further includes: determining that a difference between a first horizontal direction to the first UE and a first horizontal direction to the second UE is greater than a threshold; scheduling a transmission to the first UE; and scheduling a transmission to the second UE, wherein the transmission scheduled for the second UE is scheduled on the same time and/or frequency resource as the transmission scheduled for the first UE.

BRIEF DESCRIPTION OF THE DRAWINGS

The accompanying drawings, which are incorporated herein and form part of the specification, illustrate various embodiments.

DETAILED DESCRIPTION

Embodiments described below are explained using a single dimensional uniform array for the sake of brevity. This disclosure, however, is not limited to such a scenario and is also applicable to, for example, two-dimension arrays, in azimuth and elevation, as well as to antenna arrays that are not uniform in terms of the antenna element arrangement.

Figure 1:
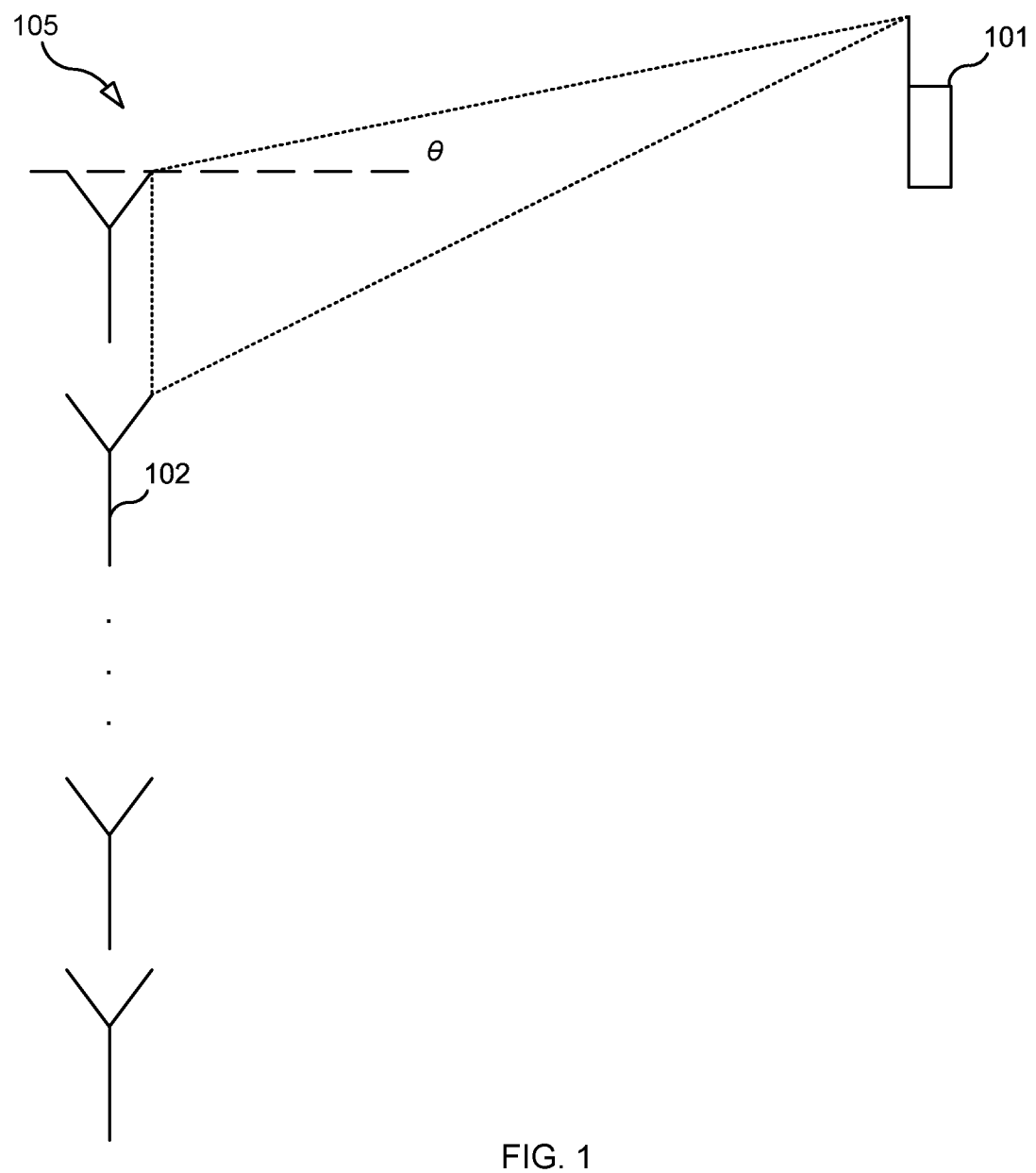
FIG. 1 illustrates a TRP communicating with a UE using a high-gain beam.
Figure 2:
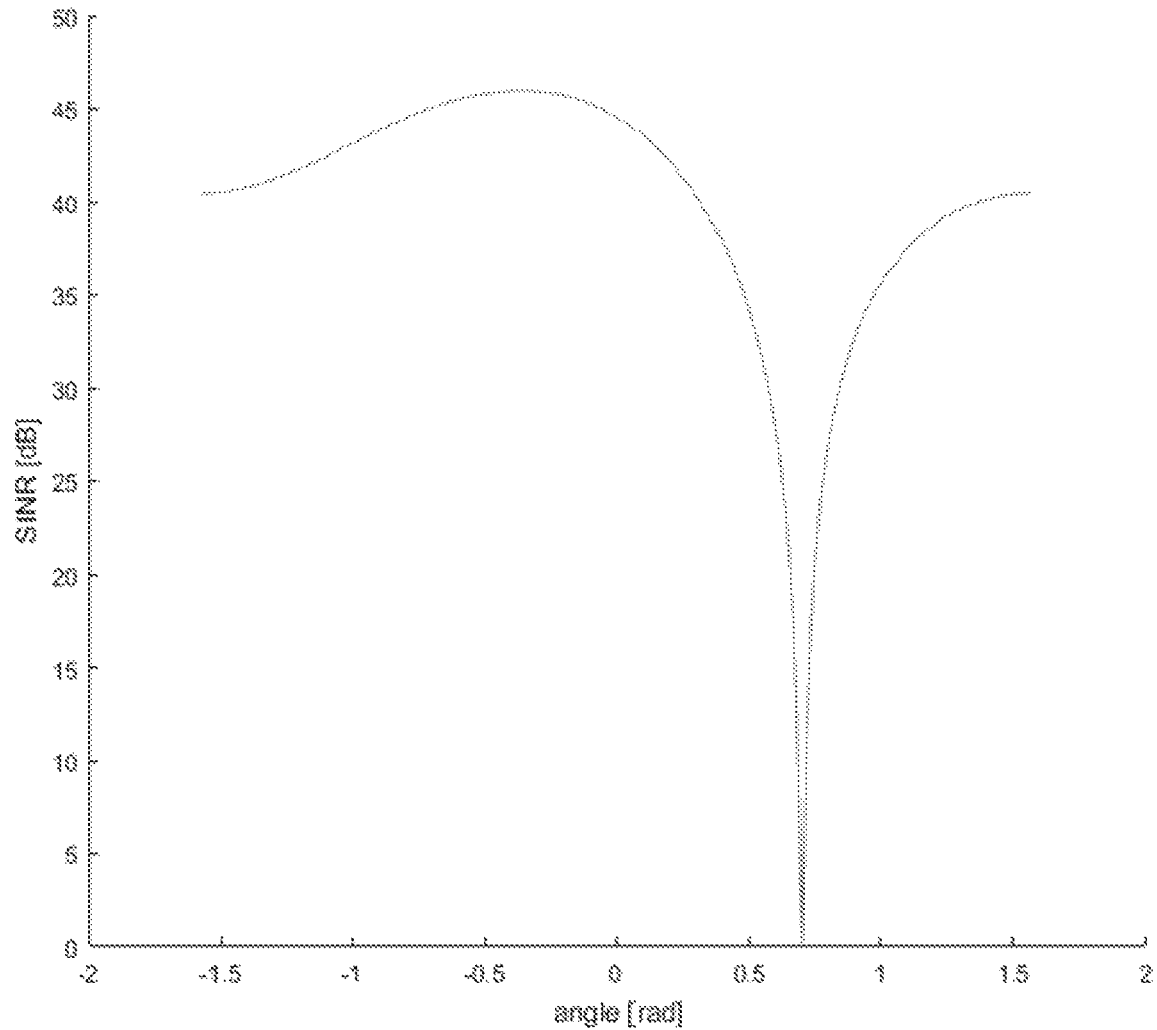
FIG. 2 is a plot illustrating SINR as a function of angle.
Figure 3:
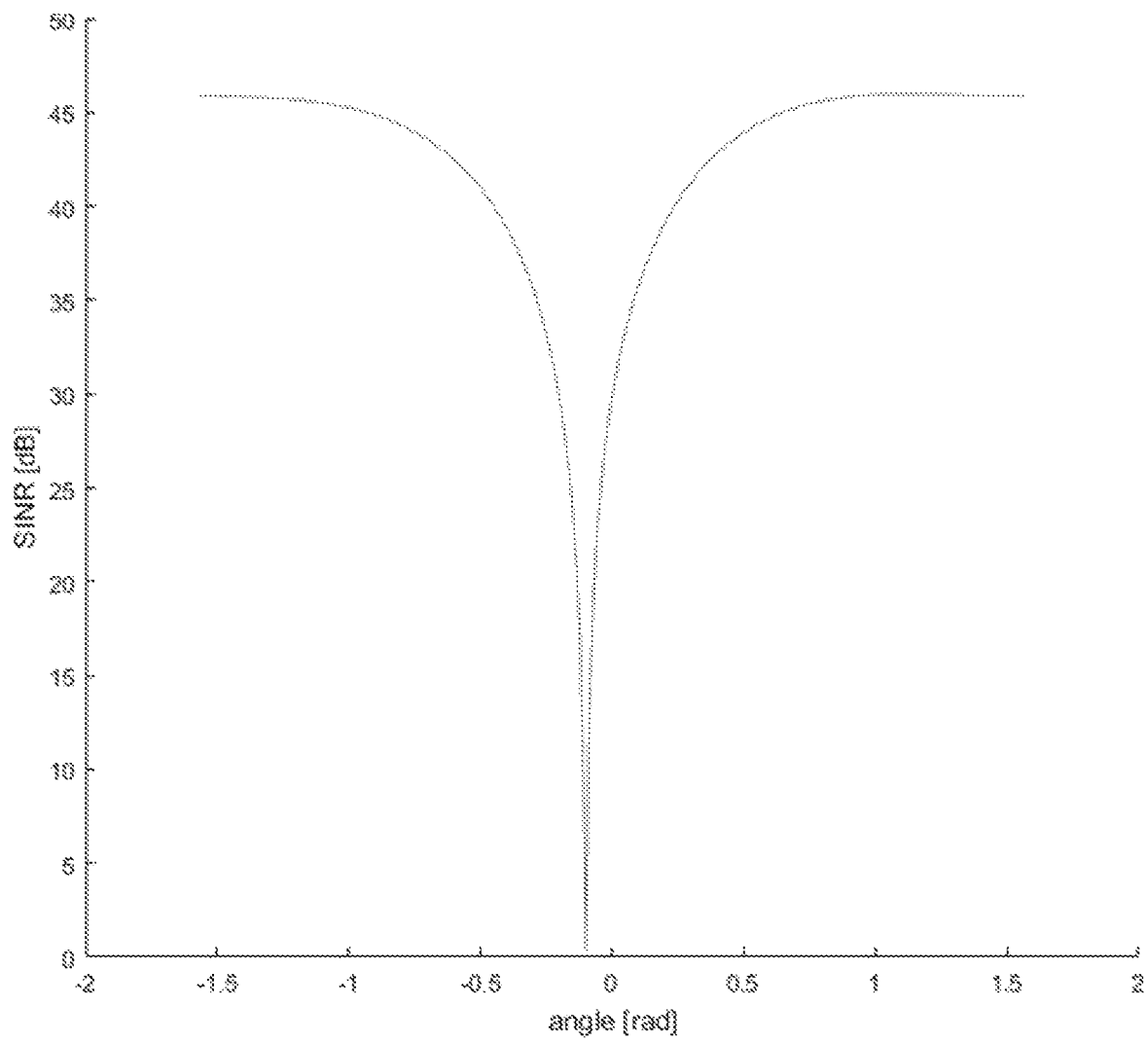
FIG. 3 is a plot illustrating SINR as a function of angle.
Figure 4:
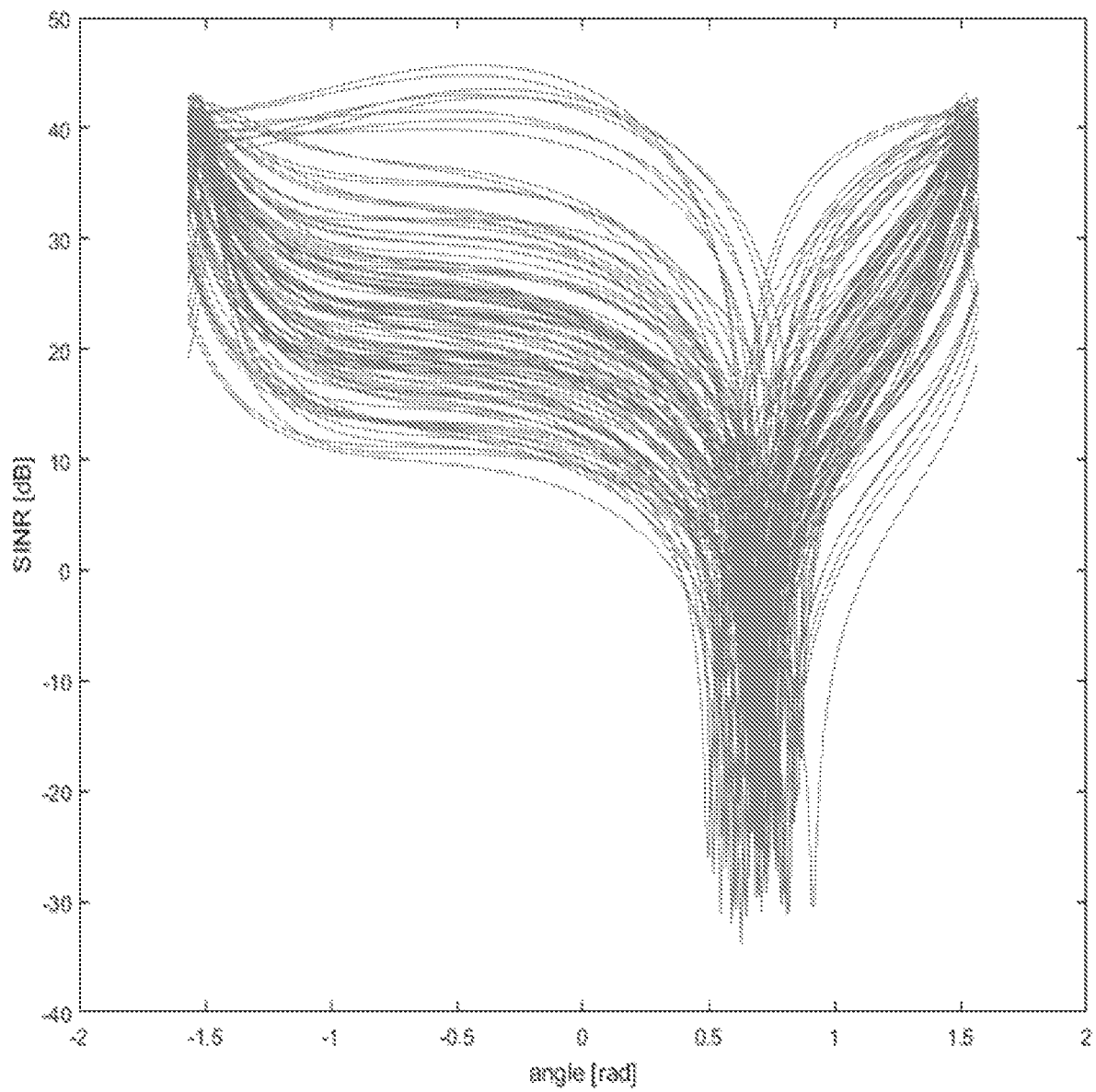
FIG. 4 is a plot illustrating SINR as a function of angle.
Figure 5:
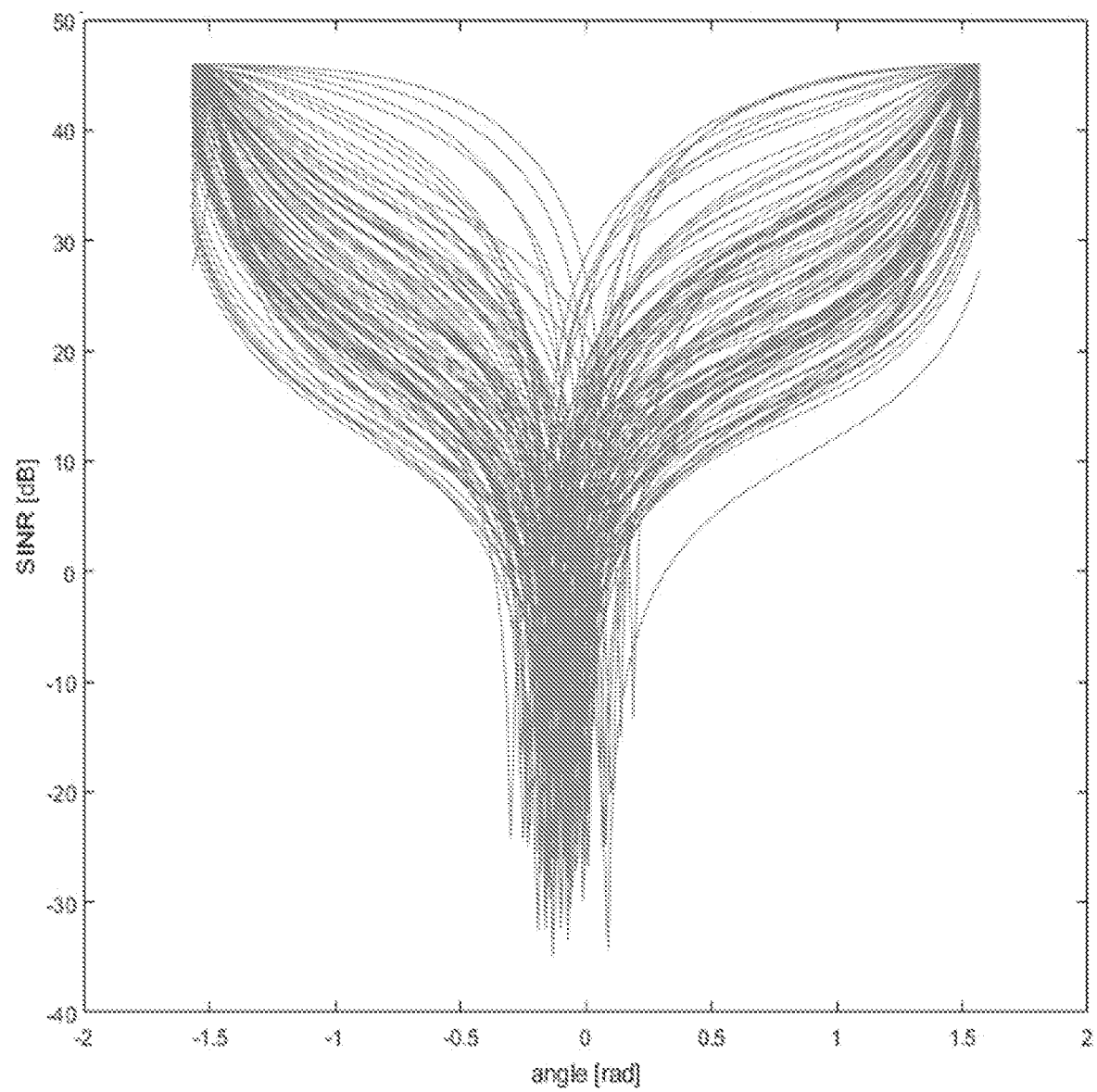
FIG. 5 is a plot illustrating SINR as a function of angle.

As described above, a problem originates from the fact that the null-forming transmission schemes may operate by placing zeros on the unit circle that represents the directions to the users. Such zeros exactly on the unit circle lead to an antenna gain that is exactly 0 in the estimated interfering direction. Unfortunately, the zeros of the antenna diagram become extremely deep and narrow in the angular dimension, and therefore the zeros becomes extremely sensitive to angular errors like beam weight quantization errors and phase noise in transmitters and receivers. In addition, channel estimation errors in terms of the phase affects the performance. FIG. 2 illustrates this fact clearly.

1. MU-MIMO "Robustification" using virtual UEs 1.1 Overview

It is first assumed that a channel matrix estimate $\hat{H}$ to a number of UEs from a gNB is available, where $$\hat{H} = \begin{pmatrix} \hat{h}_{11} & \cdots & \hat{h}_{1n_{Tx}} \\ \vdots & & \vdots \\ \hat{h}_{n_{Rx}1} & \cdots & \hat{h}_{n_{Rx}n_{Tx}} \end{pmatrix}. \quad (1)$$

The number of rows $n_{Rx}$ correspond to the total number of UE antenna elements and the number of columns $n_{Tx}$ to the number of antenna elements of the gNB antenna array. It may be the case that reciprocity based processing is applied, in which the matrix $\hat{H}$ that is valid in the downlink has been obtained from an uplink channel estimate $\hat{H}^{UL}$, as $\hat{H} = (\hat{H}^{UL})^T$. This follows since it is trivial to see the receiving antenna element in the uplink becomes the transmitting one in the downlink and vice versa, so it follows by reciprocity that the downlink channel matrix is obtained from the uplink one by a matrix transpose. Note that a conjugate transpose should not be used, only the simple transpose The RAT scheme above does place very sharp nulls in the directions of the interfered UEs, a fact that needs to be mitigated in view of the phase accuracy impairments affecting the antenna array. To do so the idea here is to introduce virtual UEs. The channel model contributions to $\hat{H}$ from the virtual UEs are generated as slightly phase perturbed (parts of) the channel estimate of the UE whose null(s) is to be widened. This means that degrees of freedoms of the gNB antenna array is used to robustify the nulling of interfered UEs. This is achieved by locating virtual UEs, at both sides of and close to a nulled UE, see FIG. 6.

1.2 Channel Matrix Augmentation

Consider a channel matrix $\hat{H}$ and denote the block corresponding to UE i by $\hat{H}_i$. With the formulation of (1), it thus holds that:

$$\hat{H} = \begin{pmatrix} \hat{H}_1 \\ \vdots \\ \hat{H}_N \end{pmatrix}. \quad (2)$$

It is hence assumed that MU-MIMO for N UEs is investigated. Then consider one row $\hat{h}_{n,k}$ of $\hat{H}_n$, with complex channel gains $\hat{h}_{n,k,l}$, k=1, ..., $K_n$, l=1, ..., $L_n$ i.e. assuming $K_n$ gNB transmit antennas and $L_n$ UE antenna elements for UE number n, n=1, ..., N. The possibly non-used antenna elements are assumed to be padded with zeros to obtain consistent matrix dimensions, should this be needed.

Then add a total of $V_n$ virtual UEs for each UE n. Each of these UEs are to use perturbed versions of the rows of the generating row of the real UE. There will be $V_n$ added rows for each row $\hat{h}_{n,k}$, although it may also be possible to leave out parts of the virtual UE addition for some rows. Each such virtual UE row is then perturbed with a phase shift corresponding to $\Delta\theta_{n,k,v}$, v=1, ... $V_n$. For the linear antenna array treated above, this means multiplying each antenna gain of the row $\hat{h}_{n,k}$ by $e^{-2\pi jk(l-1)\Delta\theta_{n,k,v}}$, giving the virtual rows $$\hat{h}_{n,k,v} = \begin{pmatrix} \hat{h}_{n,k,1} & \hat{h}_{n,k,2}e^{-2\pi jk\Delta\theta_{n,k,v}} & \cdots & \hat{h}_{n,k,L_n-1}e^{-2\pi j(L_n-2)\Delta\theta_{n,k,v}} & \hat{h}_{n,k,L_n}e^{-2\pi j(L_n-1)\Delta\theta_{n,k,v}} \end{pmatrix} \quad (3)$$
$$\begin{pmatrix} \hat{h}_{n,k,1} & \sigma\hat{h}_{n,k,2} & \cdots & \sigma^{L_n-2}\hat{h}_{n,k,L_n-1} & \sigma^{L_n-1}\hat{h}_{n,k,L_n-1} \end{pmatrix},$$

$$\sigma = e^{-2\pi jk\Delta\theta_{n,k,v}}. \quad (4)$$

The virtual UE channel estimate for the UE n then becomes $$\hat{H}_n^V = \begin{pmatrix} \hat{h}_{n,1,1} \\ \vdots \\ \hat{h}_{n,K_n,1} \\ \vdots \\ \hat{h}_{n,1,V_n} \\ \vdots \\ \hat{h}_{n,K_n,V_n} \end{pmatrix}. \quad (5)$$

The final channel matrix estimate with virtual UEs can therefore be written $$\hat{H}^V = \begin{pmatrix} H_1 \\ H_1^V \\ \vdots \\ H_N \\ H_N^V \end{pmatrix}. \quad (6)$$

1.3. Virtual RAT

The final step is to compute the beam-weights using RAT, but based on (6) as $$\hat{W}^V = ((\hat{H}^V)^H \hat{H}^V + \hat{\Gamma}^V)^{-1} (\hat{H}^V)^H H^{ref}. \quad (7)$$

Note that here $\hat{\Gamma}^V$ can also be constructed following the steps above, or as a simpler solution using $\hat{\Gamma}^V$ as an identity matrix of the appropriate dimension to normalize the RAT equations.

It remains to discuss the selection of $H^{ref}$. This matrix should be selected so that the transmissions are orthogonal between users. That means that there should be ones in the matrix elements of $H^{ref}$ that corresponds to transmission of the signal intended for a UE (e.g. column) and the received signal in said UE (row). In a simple case with one signal for each UE and one receive antenna in each UE, the matrix would be an identity matrix with a dimension equal to the number of UEs. All other values of $H^{ref}$ needs to be equal to 0. It is also necessary to note that it is critical to select $H^{ref}$ equal to zero for all matrix elements corresponding to transmission to virtual UEs, since no transmission shall be performed to these virtual UEs.

2. Evaluation

2.1 Antenna Diagrams and SIRS, 2 Rank 1 UEs, Flat Channel, Well Separated UEs A case with a Tx single dimensional (horizontal) antenna array and two UEs each with a single antenna is assumed. For simplicity, flat channels are used. The initial case treats UEs located at the angles 0.7 rad and −0.1 rad. The parameters were as follows:

$n_{Tx}=32$, $n_{Rx}=2$, $k=0.5$, $\hat{\Gamma}=10^{-8}I$, $\rho=0.999$.

Figure 7:
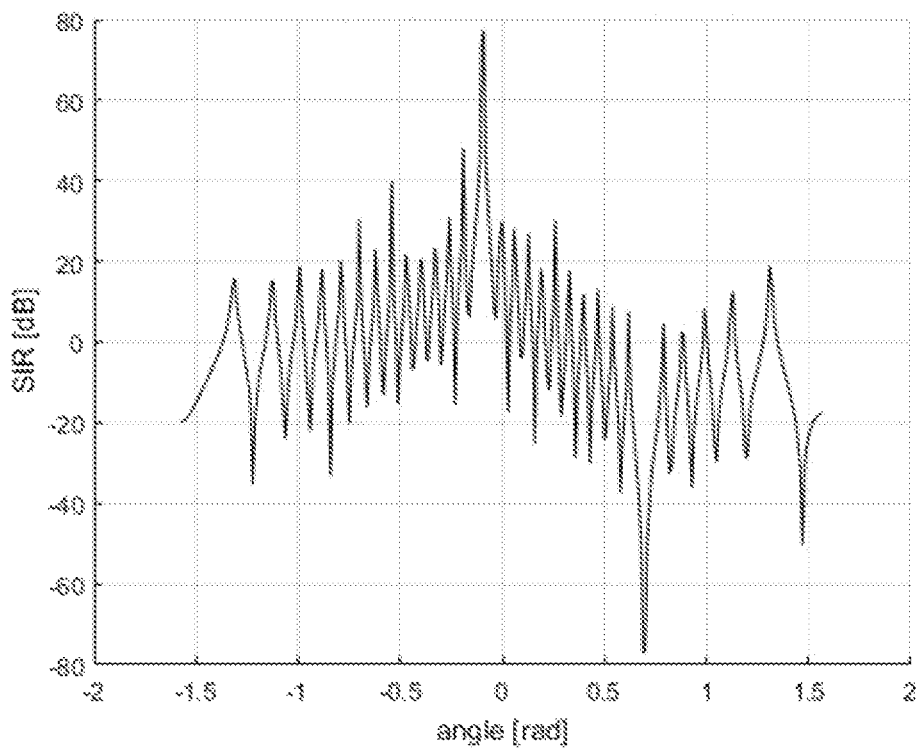
FIG. 7 is a plot illustrating the SIR of a transmission to a first UE.
Figure 8:
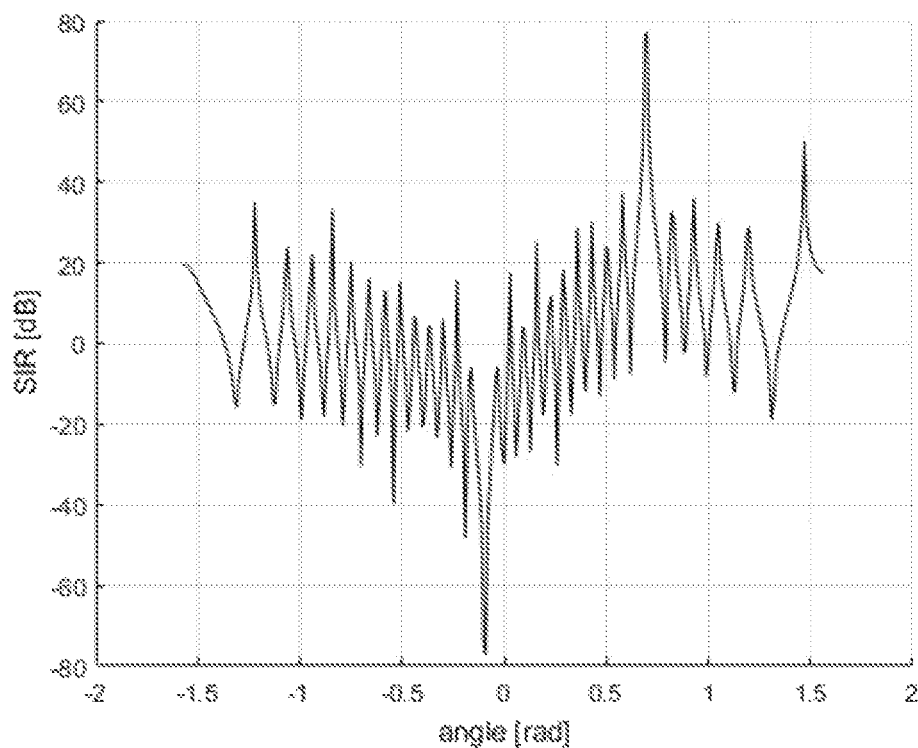
FIG. 8 is a plot illustrating the SIR of a transmission to a first UE.
Figure 9:
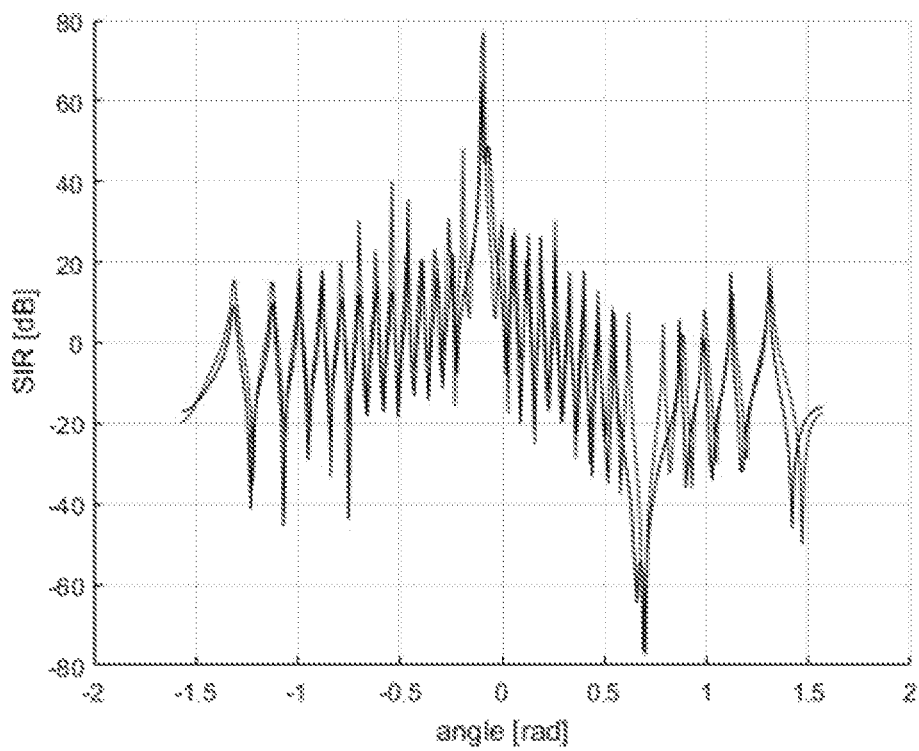
FIG. 9 is a plot illustrating the SIR of a transmission to a first UE.
Figure 10:
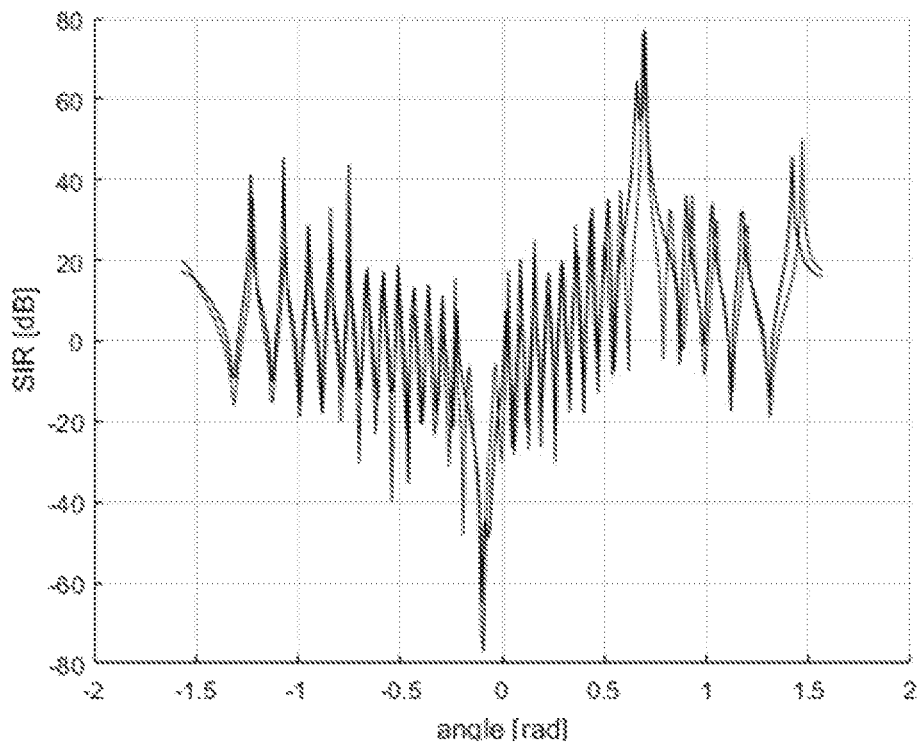
FIG. 10 is a plot illustrating the SIR of a transmission to a second UE.
Figure 11:
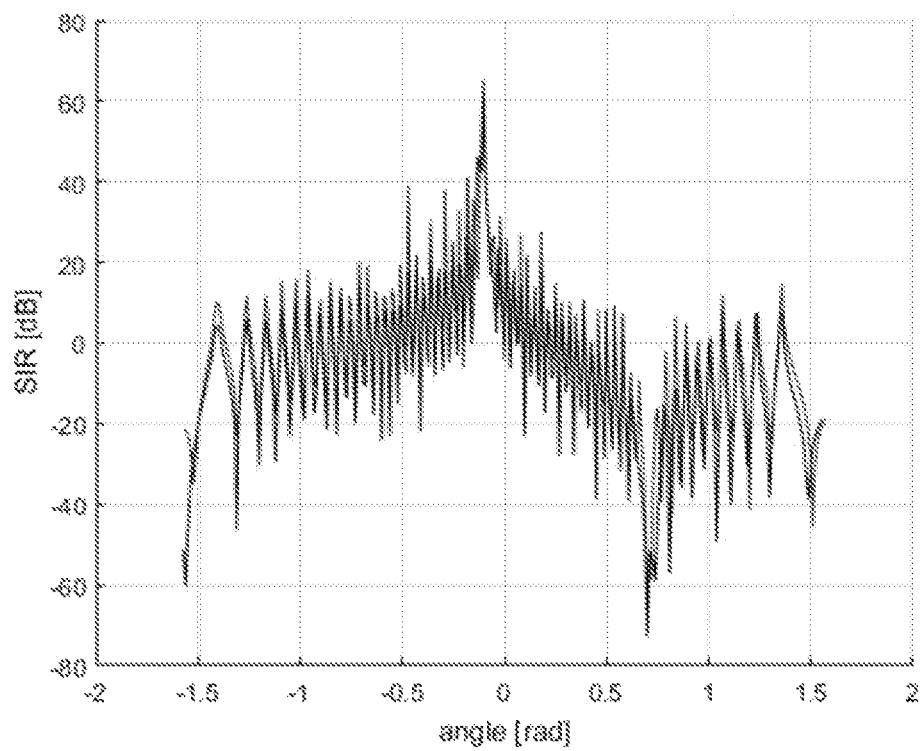
FIGS. 11-14 illustrate resulting SIRs for a virtual UE separation of 0.01.
Figure 12:
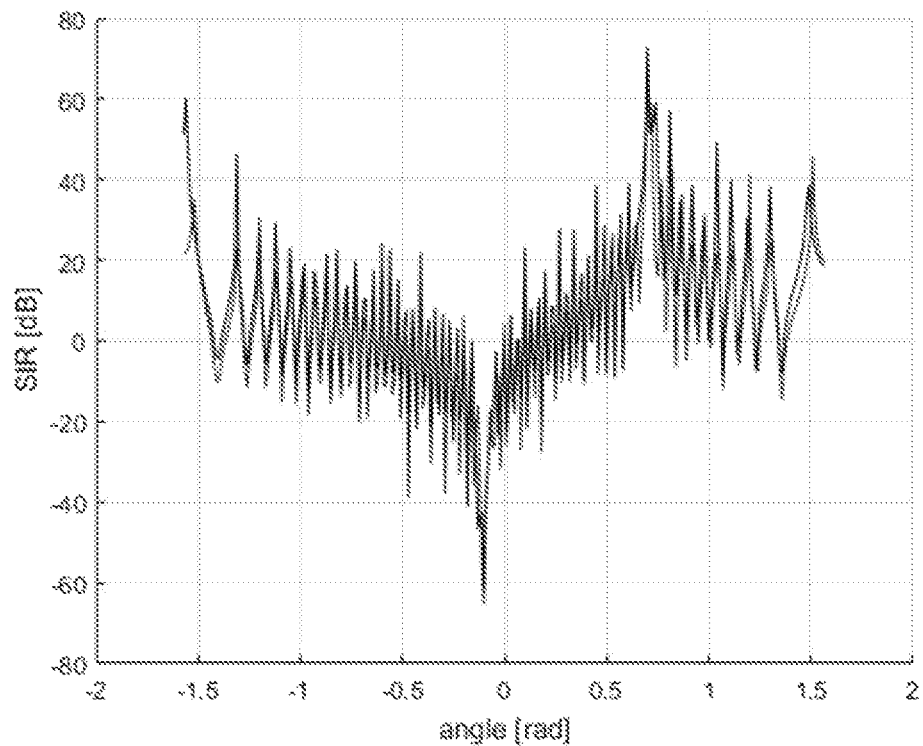
Figure 13:
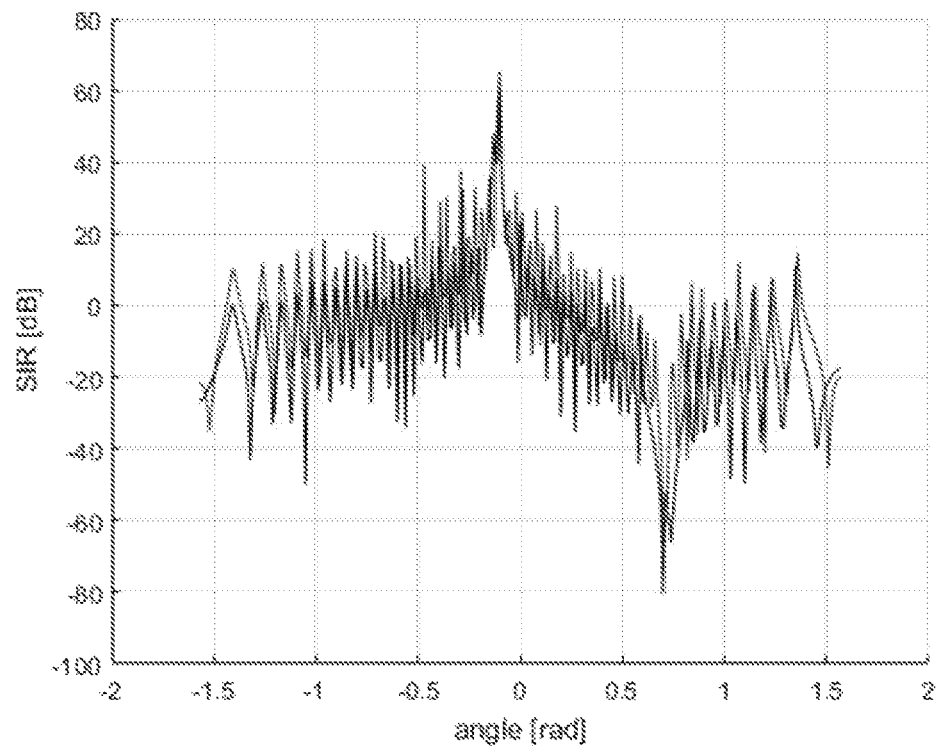
Figure 14:
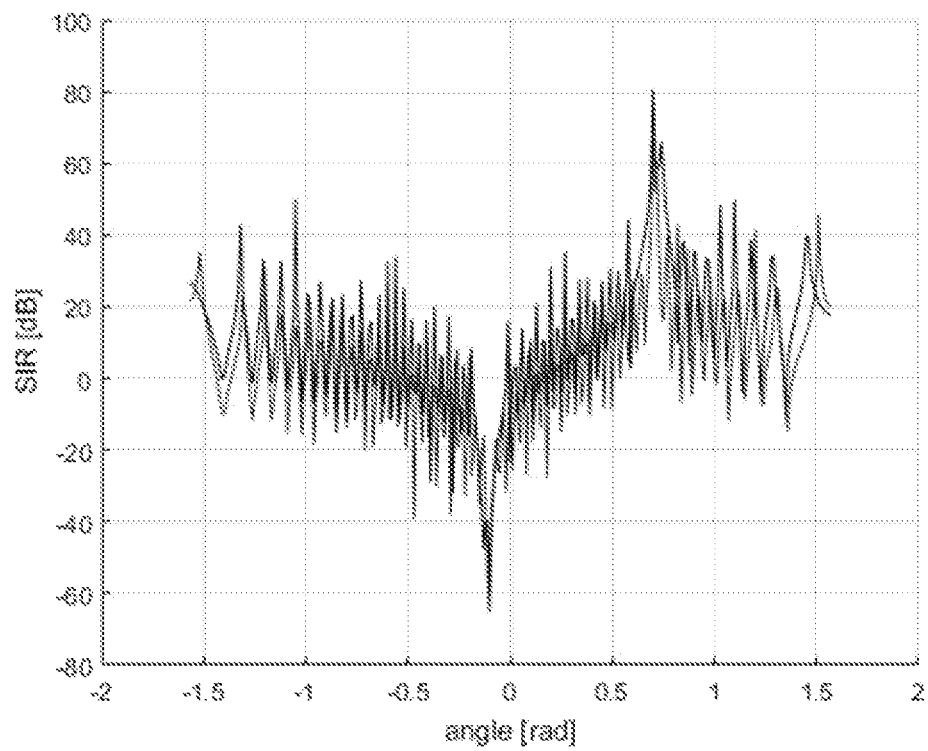
Figure 15:
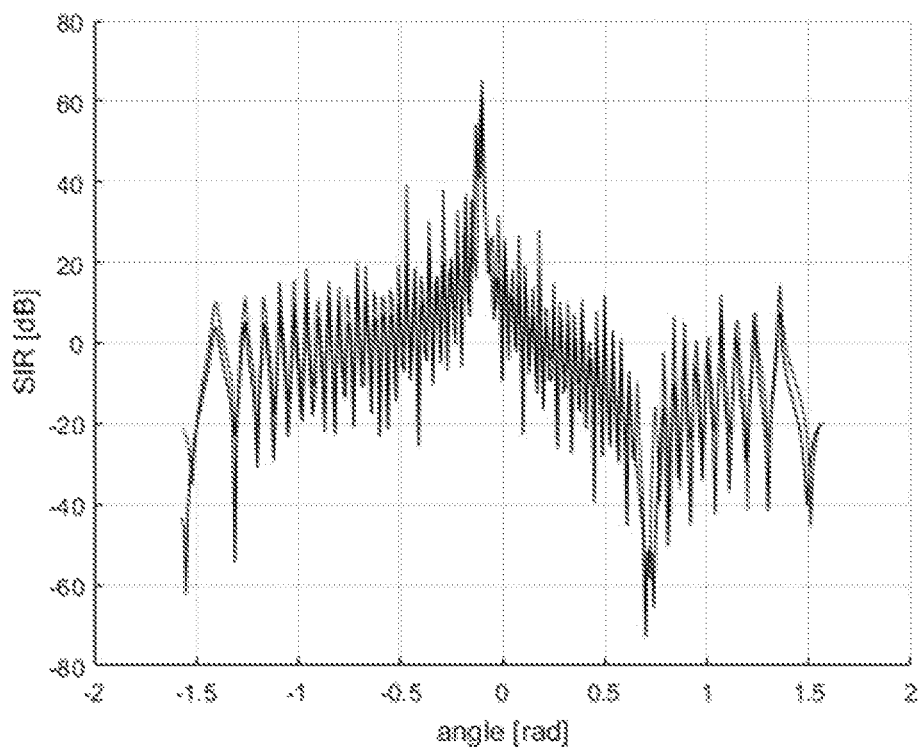
FIGS. 15-18 illustrate resulting SIRs for a virtual UE separation of 0.02.
Figure 16:
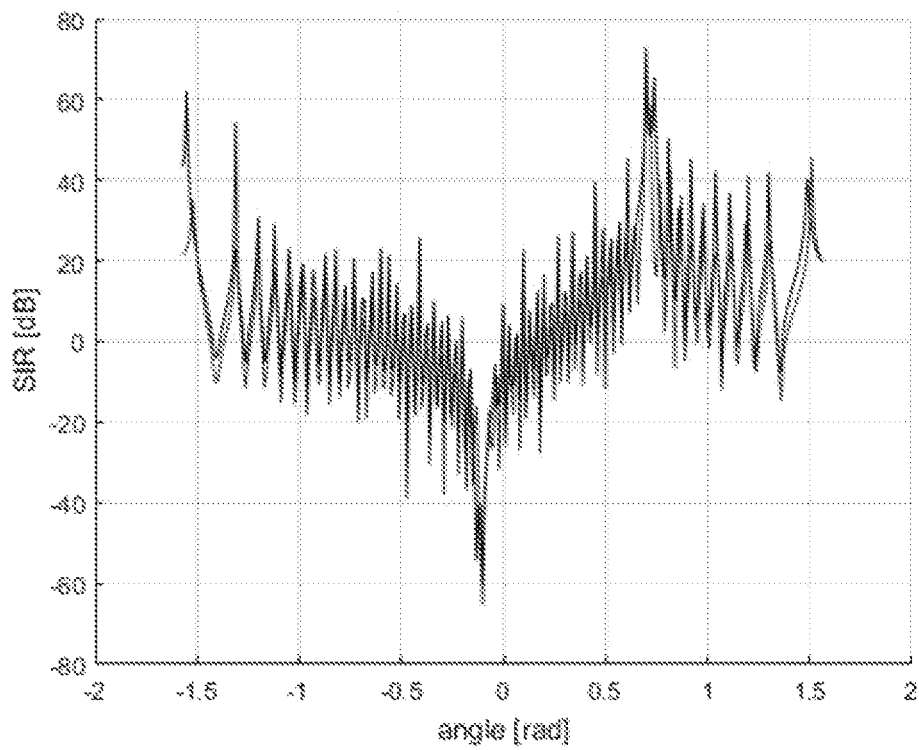
Figure 17:
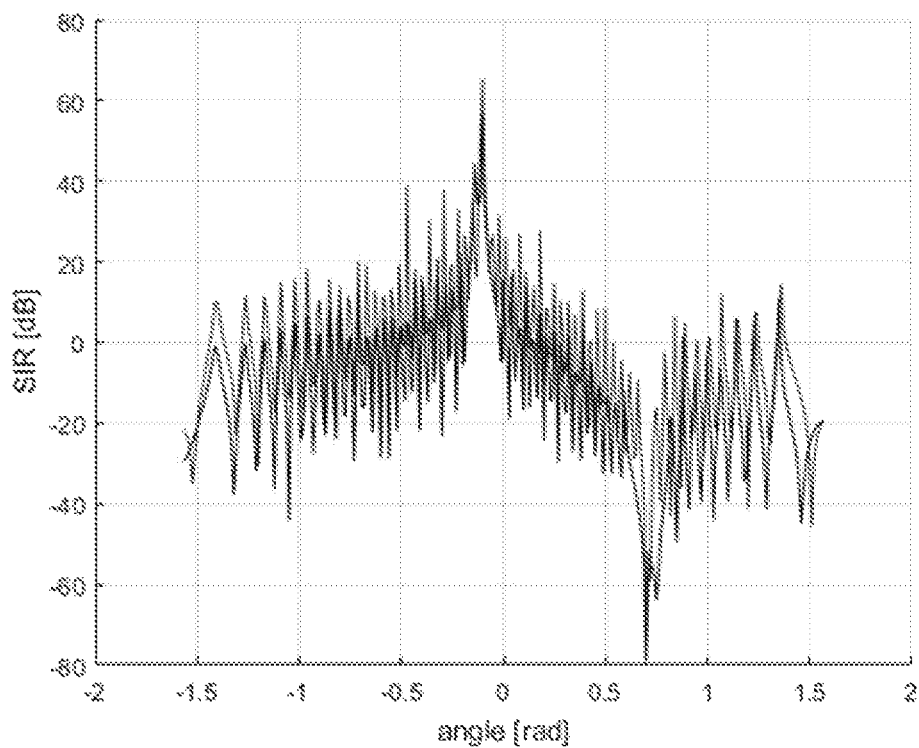
Figure 18:
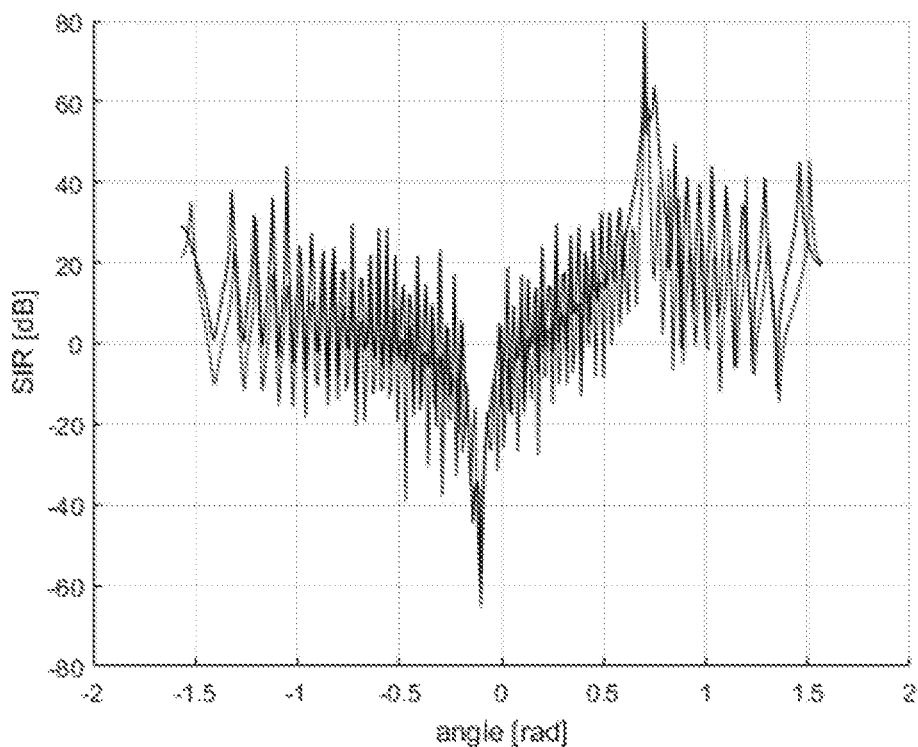
Figure 19:
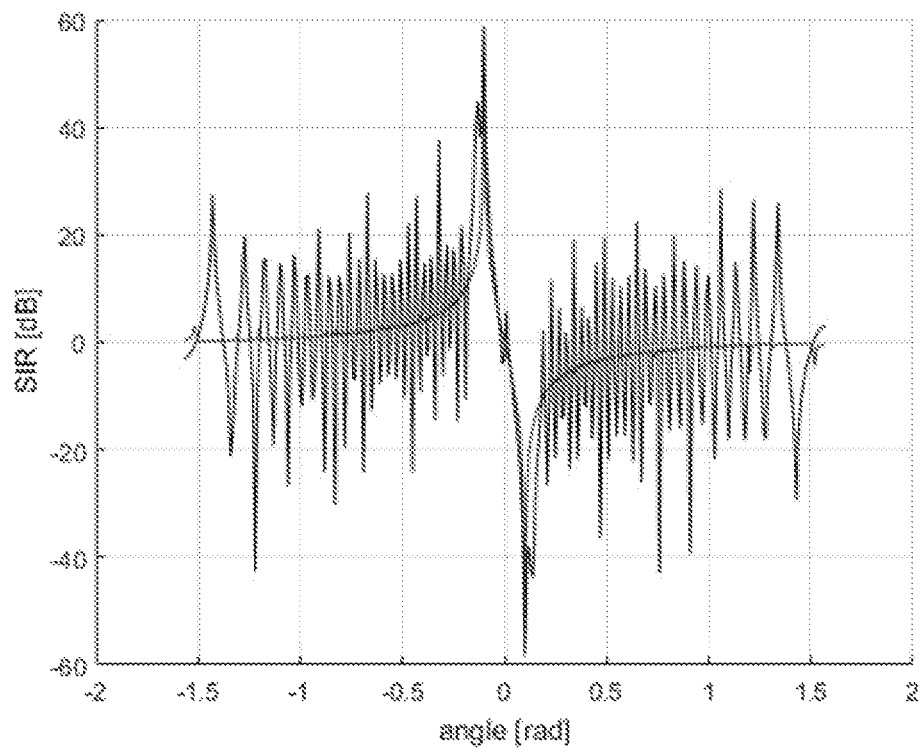
FIG. 19-24 illustrate resulting SIRs for UEs having low separation.
Figure 20:
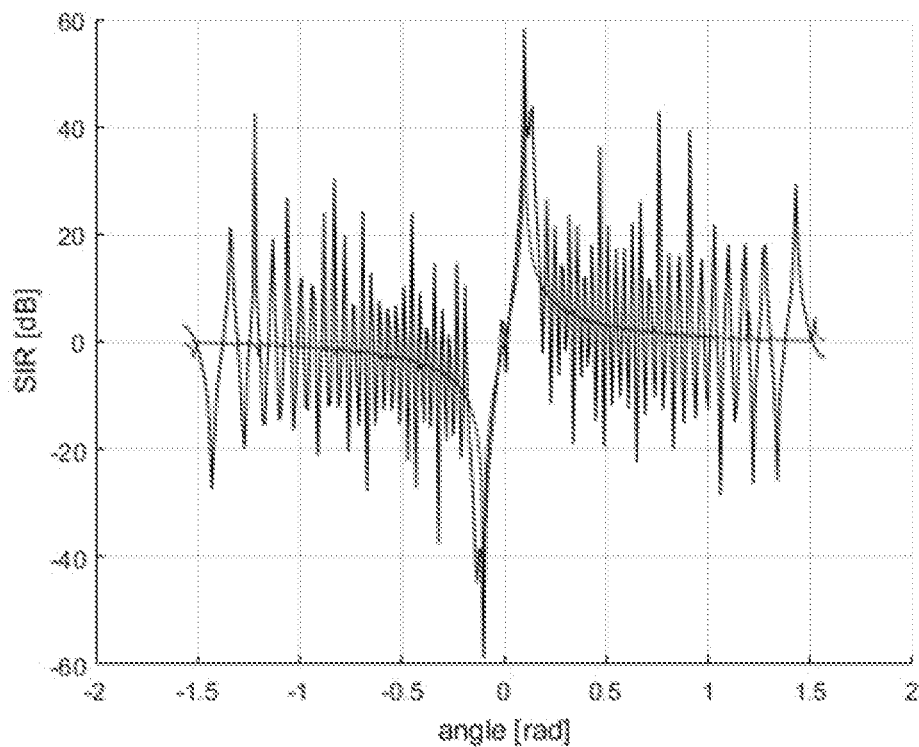
Figure 21:
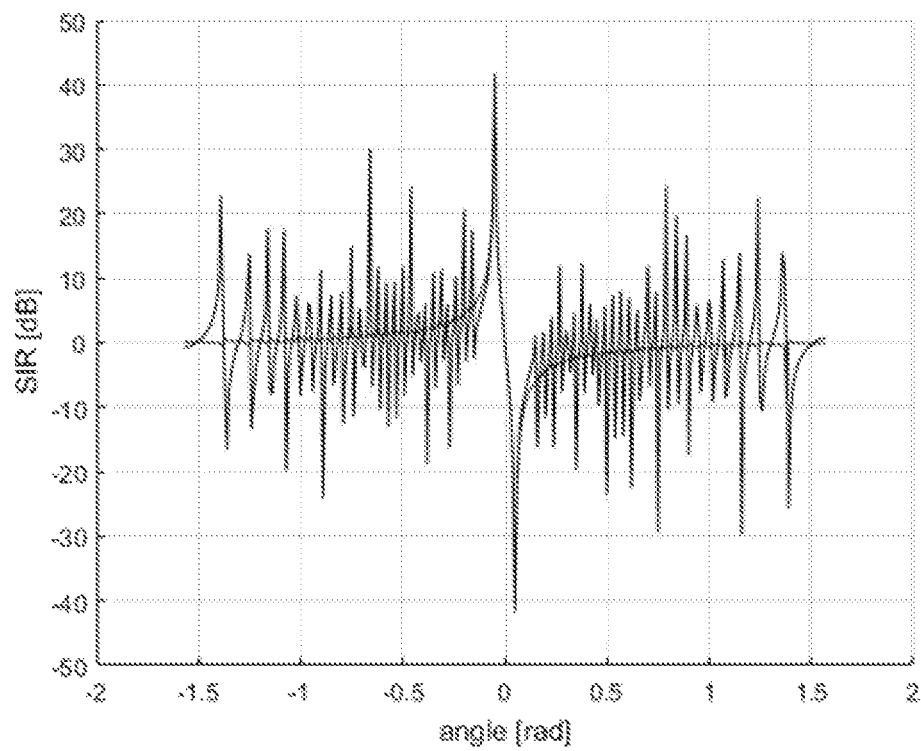
Figure 22:
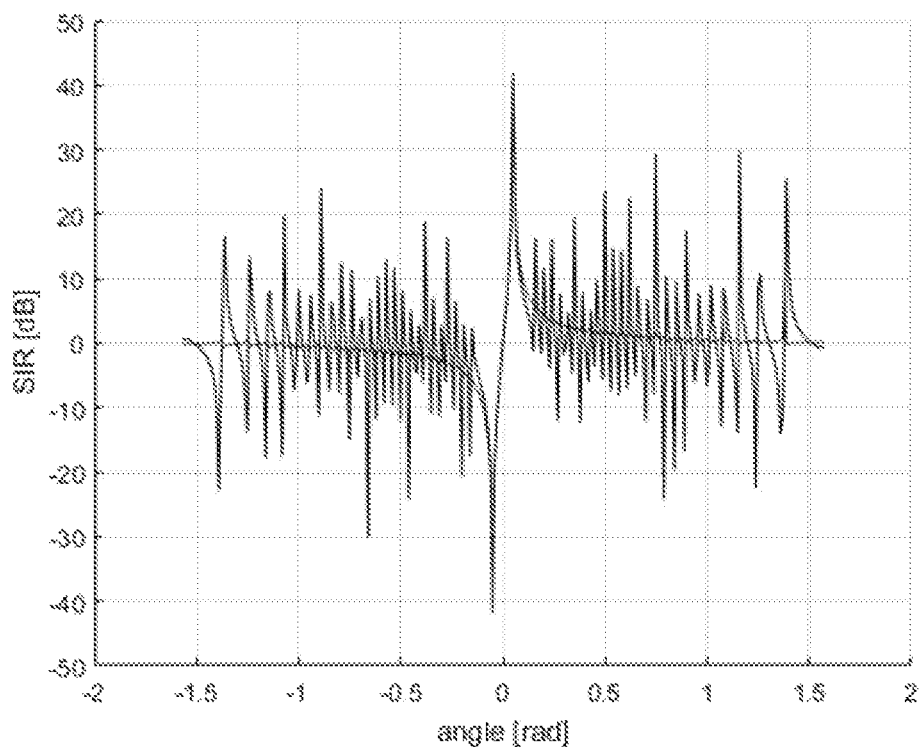
Figure 23:
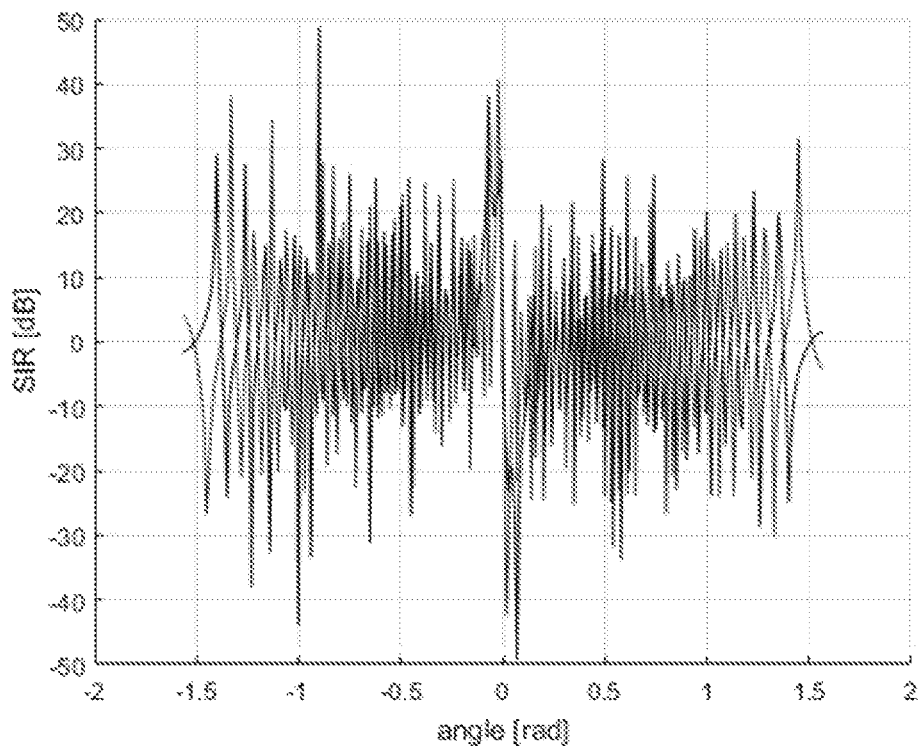
Figure 24:
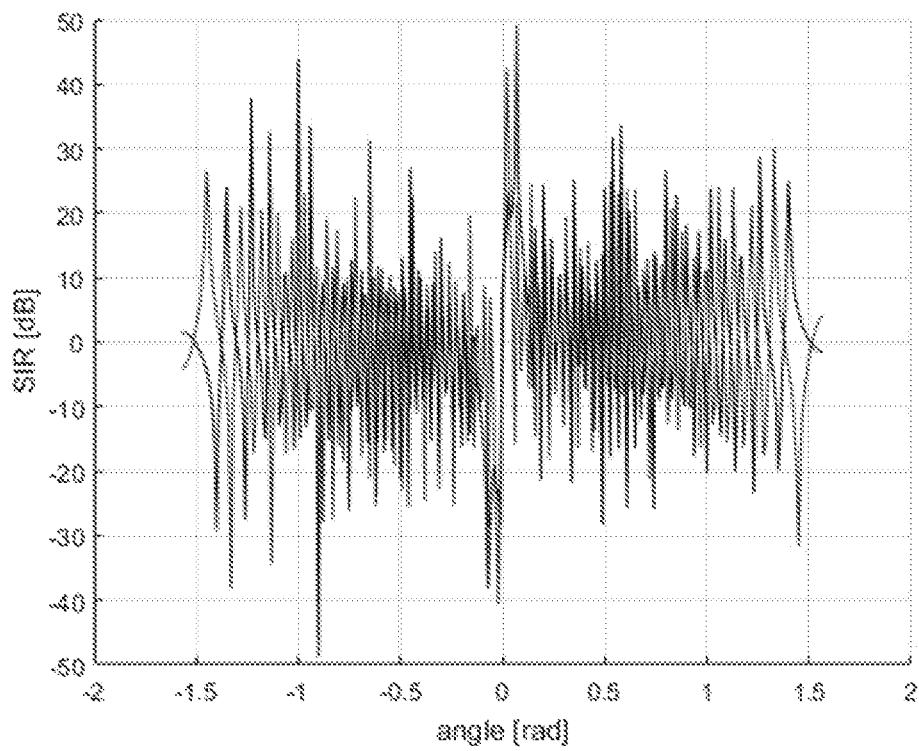

Here the parameter $\rho$ can be used as outlined in the invention P 73304 (International Publication Number: WO 2019/125240 A1; Publication Date: 27 Jun. 2019) which is hereby included by reference. FIG. 7 and FIG. 8 display the resulting antenna diagrams, expressed as signal to interference ratios (SIRS), without any virtual UE addition. The nulls can be seen, however these are as narrow as the sidelobes that are also quite deep. To mitigate the sensitivity, virtual UEs separated +/−0.02 rad from each UE was added. The result can be seen in FIG. 9 and FIG. 10. The change appears to have the intended effect, the nulls are widened while keeping the needed depth and also the SIR in the desired transmission directions.

2.2. The Number of And and the Separation of Virtual UEs

To study the effect of the number of virtual UEs and their separation, it is first noted that the virtual UE separation most likely needs to be less than the sidelobe width, in order to suppress sidelobe gain variation close to the UE. In addition, to achieve a sufficiently wide null, as compared to the angular errors, more virtual UEs are likely to be needed the larger the antenna array becomes. To study this in more detail, a case with $n_{Tx}=64$, UE separations of +/−0.01 and +/−0.02, as well as 2 or 4 virtual UEs per real UE were studied. The resulting SIRs for a virtual UE separation of 0.01 appear in FIG. 11 to FIG. 14.

The SIRs for a virtual UE separation of 0.02 appear in FIG. 15 to FIG. 18. From these plots it is clear that the modification achieves what it sets out to do—the nulls are widened. No significant losses of SIR occur, and the width of the nulls seem to be close to 15 degrees when 4 virtual UEs are used with a separation of 0.02.

Although the results appear to be promising, it is stressed that the method consumes degrees of freedom, i.e. layers. In this case a one layer transmission to 1 UE costs 5 layers in total.

2.3. SIRs, 2 Rank 1 UEs, Flat Channel, Low UE Separation

To study the behavior when the UEs are close, the 64 element antenna array above is retained, however the UEs are located at −0.1 radians and 0.1 radians, −0.05 radians and 0.05 radians as well as at −0.025 radians and 0.025 radians. The virtual UE separation was +/−0.01 radians and 4 virtual UEs per UE was used. The results appear in FIG. 19 to FIG. 24. For the largest UE separation, the nulls are widened. For UEs at +/−0.05 radians, there is no longer any gain while the smallest separation leads to a breakdown of the scheme. It is not possible to do MU-MIMO when the UEs are closer than the width of the nulls, that are in turn determined by the angular errors.

3. Scheduling and Clustering of UEs and Scheduling of Virtual UEs

Given the above evaluation, the following observations seems to be in order:

First, it is not a good idea to schedule UEs that are very close in the angular domain, on the same time or frequency resources. The scheduler should provide separation in time and/or frequency whenever: (a) Any horizontal directions $\theta_i$ and $\theta_j$ to two UEs, $UE_i$ and $UE_j$, fulfill $|\theta_i - \theta_j| < th_1$, where $th_1$ is a first threshold, for a uniform horizontal antenna array arrangement; and/or (b) Any horizontal and vertical directions $\{\theta_i, \varphi_i\}$ and $\{\theta_j, \varphi_j\}$ to two UEs, $UE_i$ and $UE_j$, fulfill $|\theta_i - \theta_j| < th_1$ and $|\varphi_i - \varphi_j| < th_2$ where $th_1$ is a first threshold, and where $th_2$ is a second threshold, for a two-dimensional antenna array arrangement.

Figure 6:
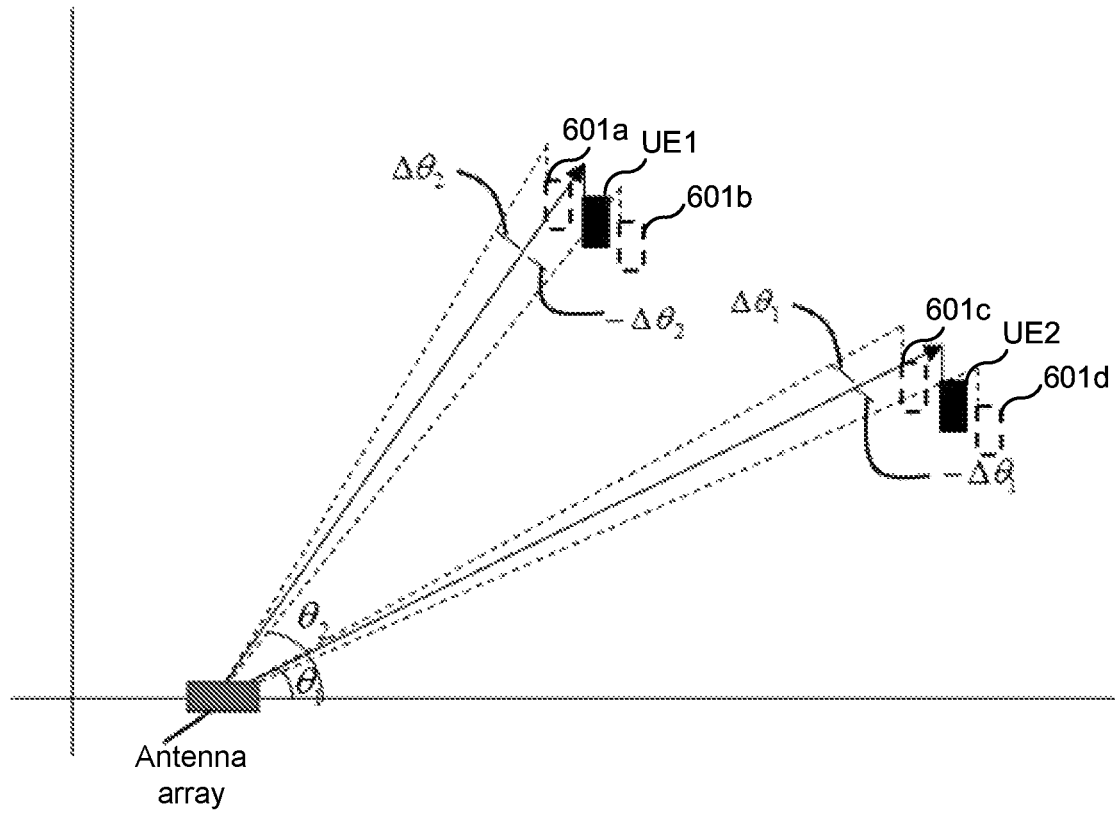
FIG. 6 illustrate the use of virtual UEs to widen antenna nulls.
Figure 25:
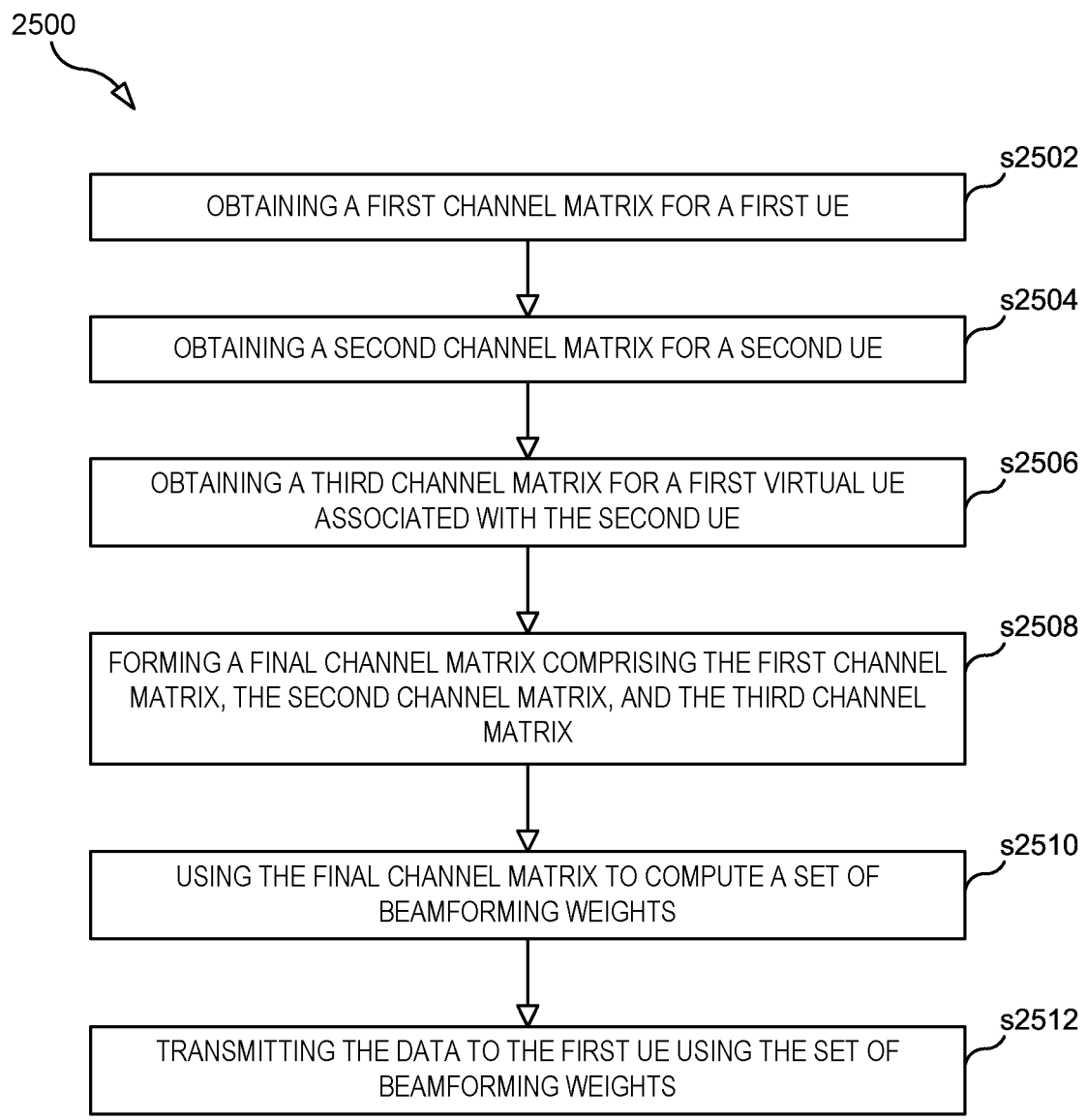
FIG. 25 is a flow chart illustrating a process according to one embodiment.

FIG. 25 is a flow chart illustrating a process 2500, according to an embodiment, for wirelessly transmitting data to a first user equipment (UE1) (see e.g., FIG. 6). Process 2500 may begin in step s2502 in which a network node (e.g., network node 2700 shown in FIG. 27), which may be a radio access node, obtains a first channel matrix for UE1. In step s2504, the network node obtains a second channel matrix for a second UE (UE2). In step s2506, the network node obtains a third channel matrix for a first virtual UE associated with the second UE (e.g., virtual UE 601c). In step s2508, the network node forms a final channel matrix, $\hat{H}^V$, comprising the first channel matrix for the first UE, the second channel matrix for the second UE, and the third channel matrix for the first virtual UE. In step s2510, the network node uses $\hat{H}^V$ to compute a set of beamforming weights, $\hat{W}^V$. In step s2512, the network node transmits the data to UE1 using the set of beamforming weights, $\hat{W}^V$.

In some embodiments, the process also includes obtaining a fourth channel matrix for a second virtual UE (e.g., virtual UE 601d) associated with the second UE, wherein the final channel matrix, $\hat{H}^V$, further comprises the fourth channel matrix for the second virtual UE.

In some embodiments, using $\hat{H}^V$ to compute the set of beamforming weights, $\hat{W}^V$, comprises calculating: $\hat{W}^V = ((\hat{H}^V)^H \hat{H}^V + \hat{\Gamma}^V)^{-1} (\hat{H}^V)^H H^{ref}$, wherein $\hat{\Gamma}^V$ is one of: a covariance matrix of a channel error matrix, $\tilde{H}^V$, and an identity matrix, and $H^{ref}$ is a reference channel matrix. In some embodiments, $H^{ref}$ is configured such that no transmission is made to the first virtual UE.

In some embodiments, the process also includes: the network node determining that a difference between a first horizontal direction to the first UE and a first horizontal direction to the second UE is greater than a threshold; the network node scheduling a transmission to the first UE; and the network node scheduling a transmission to the second UE, wherein the transmission scheduled for the second UE is scheduled on the same time and/or frequency resource as the transmission scheduled for the first UE.

Figure 26:
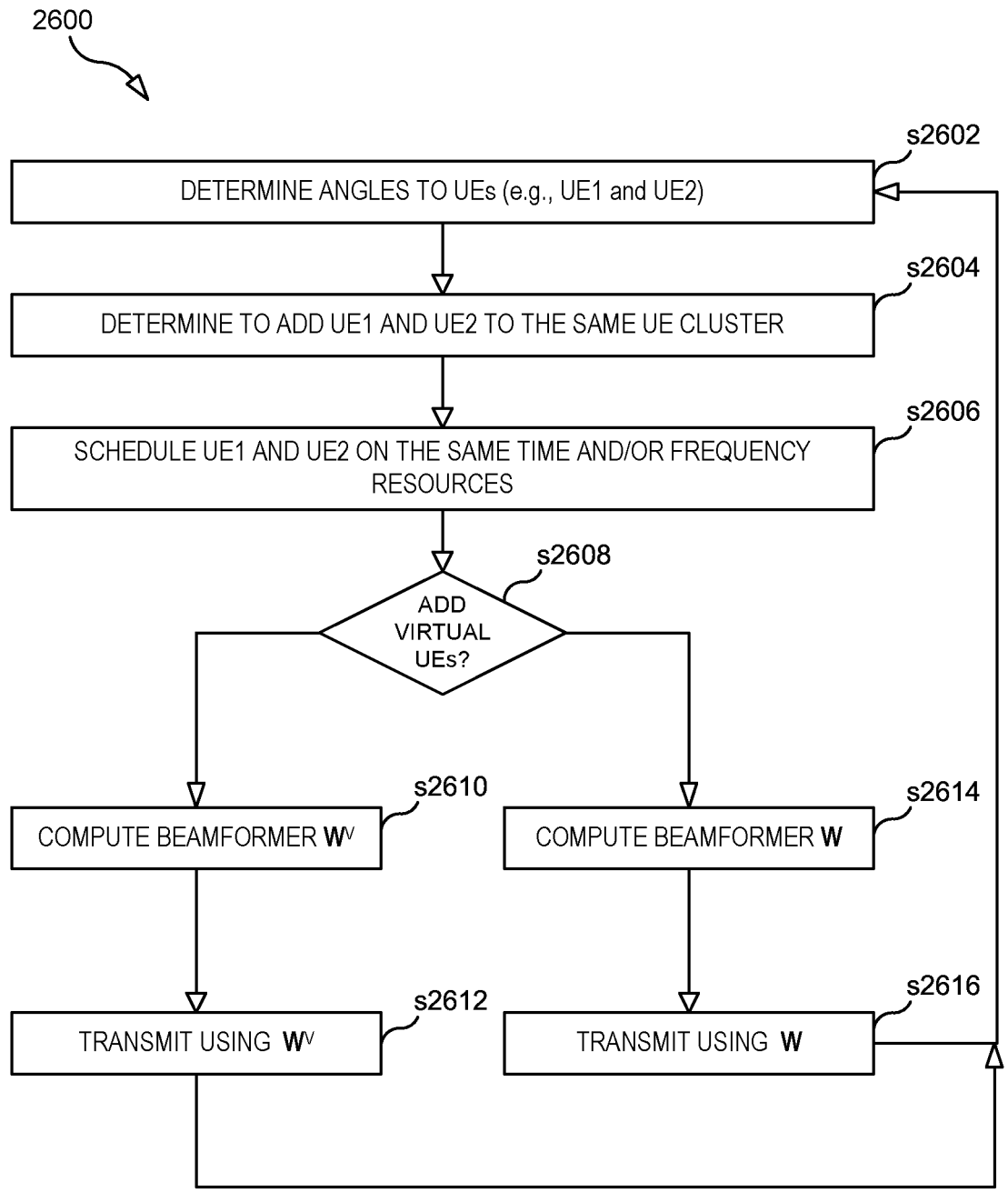
FIG. 26 is a flow chart illustrating a process according to one embodiment.

FIG. 26 is a flow chart illustrating a process 2600, according to an embodiment. Process 2600 may begin in step s2602, where a network node determines angles to UEs being served by the network node (e.g., UE1 and UE2 shown in FIG. 6). In step s2604, the network node determines that UE1 and UE2 should be added to the same UE cluster. For example, as described above, the network node may determines whether $|\theta_1-\theta_2|$ is greater than a threshold (th1) and if it is, then UE1 and UE2 may be added to the same cluster, where $\theta_1$ is horizontal angle to UE1 and $\theta_2$ is the horizontal angle to UE2. In another embodiment, as described above, the network node determines not only whether $|\theta_1-\theta_2|$ is greater than a threshold but also whether $|\varphi_1-\varphi_2|$ is greater than a threshold, where $\varphi_1$ and $\varphi_2$ are the vertical angles to UE1 and UE2, respectively, and, if at least one magnitude value exceed the respective thresholds, then the network node may include UE1 and UE2 in the same UE cluster. In step s2606, the network node schedules UE1 and UE2 on the same time and/or frequency resources. In step s2608, the network node determines whether virtual UEs should be scheduled with UE1 and UE2. If one or more virtual UEs are to be co-scheduled with UE1 and UE2, then $\hat{W}^V$ is calculated as described above (step s2610) and then the network node transmits using $\hat{W}^V$ (step s2612), otherwise the beamformer W is computed using conventional techniques and the network node transmits using W (steps s2614 and s2616).

Figure 27:
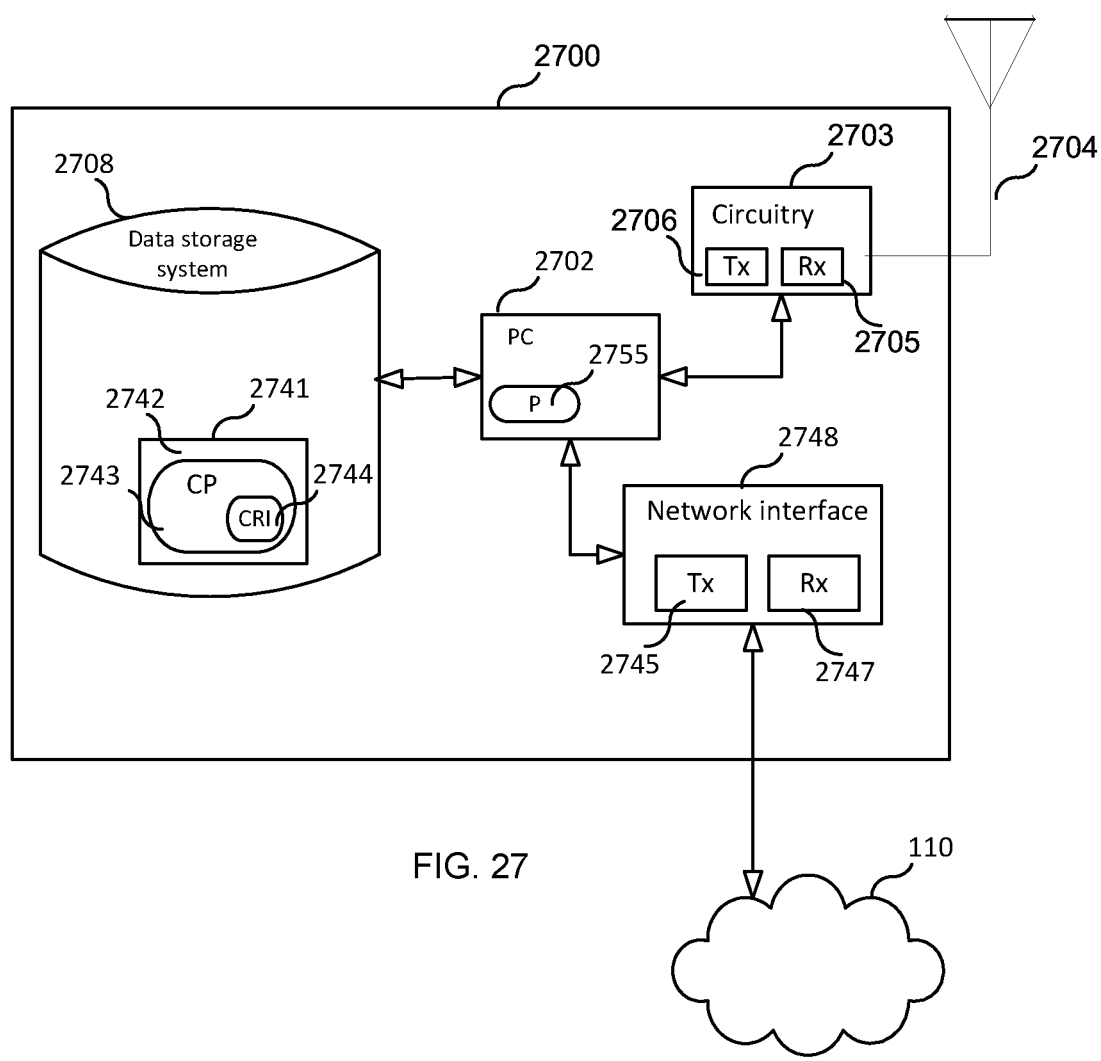
FIG. 27 is a block diagram of a network node according to one embodiment.

FIG. 27 is a block diagram of a network node 2700, according to some embodiments. As shown in FIG. 27, network node 2700 may comprise: processing circuitry (PC) 2702, which may include one or more processors (P) 2755 (e.g., a general purpose microprocessor and/or one or more other processors, such as an application specific integrated circuit (ASIC), field-programmable gate arrays (FPGAs), and the like); a network interface 2748 comprising a transmitter (Tx) 2745 and a receiver (Rx) 2747 for enabling network node 2700 to transmit data to and receive data from other nodes connected to a network 110 (e.g., an Internet Protocol (IP) network) to which network interface 2748 is connected; circuitry 2703 (e.g., radio transceiver circuitry comprising an Rx 2705 and a Tx 2706) coupled to an antenna system 2704 for wireless communication with UEs); and local storage unit (a.k.a., "data storage system") 2708, which may include one or more non-volatile storage devices and/or one or more volatile storage devices (e.g., random access memory (RAM)). In embodiments where PC 2702 includes a programmable processor, a computer program product (CPP) 2741 may be provided. CPP 2741 includes a computer readable medium (CRM) 2742 storing a computer program (CP) 2743 comprising computer readable instructions (CRI) 2744. CRM 2742 may be a non-transitory computer readable medium, such as, but not limited to, magnetic media (e.g., a hard disk), optical media, memory devices (e.g., random access memory, flash memory), and the like. In some embodiments, the CRI 2744 of computer program 2743 is configured such that when executed by PC 2702, the CRI causes network node 2700 to perform steps described herein (e.g., steps described herein with reference to the flow charts). In other embodiments, network node 2700 may be configured to perform steps described herein without the need for code. That is, for example, PC 2702 may consist merely of one or more ASICs. Hence, the features of the embodiments described herein may be implemented in hardware and/or software.

Figure 28:
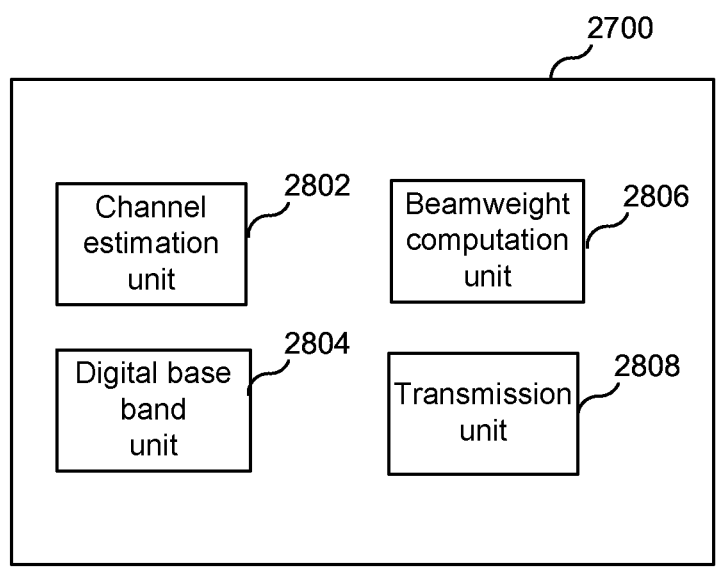
FIG. 28 is a diagram showing functional units of network node according to one embodiment.

FIG. 28 is a diagram showing functional units of network node 2700 according to one embodiment. In the embodiment shown, network node 2700 includes: a channel estimation unit 2802 for obtaining a first channel matrix for the first UE, a second channel matrix for a second UE, and a third channel matrix for a first virtual UE associated with the second UE; a digital base band unit 2804 for forming a final channel matrix, $\hat{H}^V$, comprising the first channel matrix, the second channel matrix, and the third channel matrix; a beamweight computation unit 2806 for using $\hat{H}^V$ to compute a set of beamforming weights, $\hat{W}^V$; and a transmission unit for employing a transmitter to transmit the data to the first UE using the set of beamforming weights, $\hat{W}^V$.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for wirelessly transmitting data to a first user equipment (UE), the method comprising:
    obtaining a first channel matrix for the first UE;
    obtaining a second channel matrix for a second UE;
    obtaining a third channel matrix for a first virtual UE associated with the second UE;
    forming a final channel matrix $\hat{H}^V$ comprising the first channel matrix for the first UE, the second channel matrix for the second UE, and the third channel matrix for the first virtual UE;
    using $\hat{H}^V$ to compute a set of beamforming weights $\hat{W}^V$; and
    transmitting the data to the first UE using the set of beamforming weights $\hat{W}^V$.

2. The method of claim 1, further comprising obtaining a fourth channel matrix for a second virtual UE associated with the second UE, wherein the final channel matrix $\hat{H}^V$ further comprises the fourth channel matrix for the second virtual UE.

3. The method of claim 1, wherein using $\hat{H}^V$ to compute the set of beamforming weights $\hat{W}^V$ comprises calculating:
$\hat{W}^V = ((\hat{H}^V)^H \hat{H}^V + \hat{\Gamma}^V)^{-1} (\hat{H}^V)^H H^{ref}$, wherein
$\hat{\Gamma}^V$ is a covariance matrix of a channel error matrix $\hat{H}^V$ or an identity matrix, and
$\hat{H}^{ref}$ is a reference channel matrix.

4. The method of claim 3, wherein $\hat{H}^{ref}$ is configured such that no transmission is made to the first virtual UE.

5. The method of claim 1 further comprising:
determining that a difference between a first horizontal direction to the first UE and a first horizontal direction to the second UE is greater than a threshold;
scheduling a transmission to the first UE; and
scheduling a transmission to the second UE, wherein
the transmission scheduled for the second UE is scheduled on a same time resource, same frequency resource, or both the same time and frequency resource as the transmission scheduled for the first UE.

6. A network node for use in wirelessly transmitting data to a first user equipment (UE), the network node comprising:
a processor; and
a memory containing instructions which, when executed by the processor, cause the network node to:
obtain a first channel matrix for the first UE;
obtain a second channel matrix for a second UE;
obtain a third channel matrix for a first virtual UE associated with the second UE;
form a final channel matrix $\hat{H}^V$ comprising the first channel matrix for the first UE, the second channel matrix for the second UE, and the third channel matrix for the first virtual UE;
use $\hat{H}^V$ to compute a set of beamforming weights $\hat{W}^V$; and
initiate the transmission of the data to the first UE using the set of beamforming weights $\hat{W}^V$.

7. The network node of claim 6, wherein the network node is further to obtain a fourth channel matrix for a second virtual UE associated with the second UE, wherein the final channel matrix $\hat{H}^V$ further comprises the fourth channel matrix for the second virtual UE.

8. The network node of claim 6, wherein using $\hat{H}^V$ to compute the set of beamforming weights $\hat{W}^V$ comprises calculating:
$\hat{W}^V = ((\hat{H}^V)^H \hat{H}^V + \hat{\Gamma}^V)^{-1} (\hat{H}^V)^H H^{ref}$, wherein
$\hat{\Gamma}^V$ is a covariance matrix of a channel error matrix $\hat{H}^V$ or an identity matrix, and $\hat{H}^{ref}$ is a reference channel matrix.

9. The network node of claim 8, wherein $\hat{H}^{ref}$ is configured such that no transmission is made to the first virtual UE.

10. The network node of claim 6, wherein the network node is further to:
determine that a difference between a first horizontal direction to the first UE and a first horizontal direction to the second UE is greater than a threshold;
schedule a transmission to the first UE; and
schedule a transmission to the second UE, wherein
the transmission scheduled for the second UE is scheduled on a same time resource, or same frequency resource, or both the same time and frequency resource as the transmission scheduled for the first UE.

11. A network node for use in wirelessly transmitting data to a first user equipment (UE), the network node comprising:
a channel estimation unit configured to obtain: a first channel matrix for the first UE, a second channel matrix for a second UE, and a third channel matrix for a first virtual UE associated with the second UE;
a digital baseband unit configured to form a final channel matrix $\hat{H}^V$ comprising the first channel matrix for the first UE, the second channel matrix for the second UE, and the third channel matrix for the first virtual UE;
a beamweight computation unit configured to use $\hat{H}^V$ to compute a set of beamforming weights $\hat{W}^V$; and
a transmission unit configured to initiate the transmission of the data to the first UE using the set of beamforming weights $\hat{W}^V$.

12. A non-transitory computer-readable storage medium comprising instructions which, when executed by a processor of a network node for wirelessly transmitting data to a first user equipment (UE), are capable of causing the network node to perform operations comprising:
obtaining a first channel matrix for the first UE;
obtaining a second channel matrix for a second UE;
obtaining a third channel matrix for a first virtual UE associated with the second UE;
forming a final channel matrix $\hat{H}^V$ comprising the first channel matrix for the first UE, the second channel matrix for the second UE, and the third channel matrix for the first virtual UE;
using $\hat{H}^V$ to compute a set of beamforming weights $\hat{W}^V$; and
transmitting the data to the first UE using the set of beamforming weights $\hat{W}^V$.

13. The non-transitory computer-readable storage medium of claim 12, wherein the instructions further perform operations comprising obtaining a fourth channel matrix for a second virtual UE associated with the second UE, wherein the final channel matrix $\hat{H}^V$ further comprises the fourth channel matrix for the second virtual UE.

14. The non-transitory computer-readable storage medium of claim 12, wherein using $\hat{H}^V$ to compute the set of beamforming weights $\hat{W}^V$ comprises calculating:
$\hat{W}^V = ((\hat{H}^V)^H \hat{H}^V + \hat{\Gamma}^V)^{-1} (\hat{H}^V)^H H^{ref}$, wherein
$\hat{\Gamma}^V$ is a covariance matrix of a channel error matrix $\hat{H}^V$ or an identity matrix, and $\hat{H}^{ref}$ is a reference channel matrix.

15. The non-transitory computer-readable storage medium of claim 14, wherein $\hat{H}^{ref}$ is configured such that no transmission is made to the first virtual UE.

16. The non-transitory computer-readable storage medium of claim 12, wherein the instructions further perform operations comprising:
determining that a difference between a first horizontal direction to the first UE and a first horizontal direction to the second UE is greater than a threshold;
scheduling a transmission to the first UE; and
scheduling a transmission to the second UE, wherein
the transmission scheduled for the second UE is scheduled on a same time resource, same frequency resource, or both the same time and frequency resource as the transmission scheduled for the first UE.

* * * * *